(12) United States Patent
Minoura et al.

(10) Patent No.: US 9,411,158 B2
(45) Date of Patent: Aug. 9, 2016

(54) MOTH-EYE FILM

(71) Applicant: Sharp Kabushiki Kaisha, Osaka-shi, Osaka (JP)

(72) Inventors: Kiyoshi Minoura, Osaka (JP); Akinobu Isurugi, Osaka (JP); Tomoko Teranishi, Osaka (JP); Eiji Satoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/424,151

(22) PCT Filed: Jul. 12, 2013

(86) PCT No.: PCT/JP2013/069155
§ 371 (c)(1),
(2) Date: Feb. 26, 2015

(87) PCT Pub. No.: WO2014/038288
PCT Pub. Date: Mar. 13, 2014

(65) Prior Publication Data
US 2015/0226961 A1   Aug. 13, 2015

(30) Foreign Application Priority Data

Sep. 5, 2012   (JP) .................................. 2012-195554

(51) Int. Cl.
*G02B 27/00* (2006.01)
*G02B 1/04* (2006.01)
*E06B 7/12* (2006.01)
*G02B 1/118* (2015.01)

(52) U.S. Cl.
CPC ............... *G02B 27/0006* (2013.01); *E06B 7/12* (2013.01); *G02B 1/04* (2013.01); *G02B 1/118* (2013.01)

(58) Field of Classification Search
CPC ...... G02B 27/0006; G02B 1/118; G02B 1/04; E06B 7/12
USPC ........... 359/507, 599, 601, 609; 428/141, 152
See application file for complete search history.

(56) References Cited

U.S. PATENT DOCUMENTS

| 2004/0067339 A1 | 4/2004 | Gandon et al. |
| 2007/0022798 A1 | 2/2007 | Morinaga et al. |
| 2009/0014416 A1 | 1/2009 | Gandon et al. |

(Continued)

FOREIGN PATENT DOCUMENTS

| CN | 101223025 A | 7/2008 |
| JP | 2003089975 A | 3/2003 |

(Continued)

OTHER PUBLICATIONS

International Search Report PCT/ISA/210 for International Application No. PCT/JP2013/069155 Dated Oct. 22, 2013.

*Primary Examiner* — Frank Font
(74) *Attorney, Agent, or Firm* — Harness, Dickey & Pierce, P.L.C.

(57) ABSTRACT

The present invention provides a moth-eye film that is not likely to cause condensation on the surface. A moth-eye film including: a resin composition that, when formed into a flat film, has a contact angle with water of larger than 5° but smaller than 31.3°, the contact angle measured between a surface of the flat film and a droplet of water dropped onto the surface of the flat film, after 100 msec from contact of the droplet and the surface.

7 Claims, 25 Drawing Sheets

(56) References Cited

U.S. PATENT DOCUMENTS

| | | |
|---|---|---|
| 2010/0323165 A1 | 12/2010 | Sakuma et al. |
| 2011/0318539 A1* | 12/2011 | Ozawa .................... B29C 33/60 428/172 |
| 2012/0127580 A1* | 5/2012 | Okamoto ................ G02B 1/118 359/609 |
| 2012/0200932 A1* | 8/2012 | Minari .................. B29C 33/424 359/601 |
| 2012/0212825 A1* | 8/2012 | Nomura ................. G02B 1/118 359/580 |
| 2013/0011611 A1 | 1/2013 | Taguchi et al. |
| 2014/0065367 A1 | 3/2014 | Matsumoto et al. |

FOREIGN PATENT DOCUMENTS

| | | |
|---|---|---|
| JP | 2004502625 A | 1/2004 |
| JP | 2004060162 A | 2/2004 |
| JP | 2008158293 A | 7/2008 |
| JP | 2009258487 A | 11/2009 |
| JP | 2010044184 A | 2/2010 |
| JP | 2010219495 A | 9/2010 |
| JP | 2011169961 A | 9/2011 |
| JP | 4796659 B2 | 10/2011 |
| JP | 2012079782 A | 4/2012 |
| WO | WO-2011118367 A1 | 9/2011 |
| WO | WO-2012157717 A1 | 11/2012 |

* cited by examiner

Refractive index

MOTH-EYE FILM

TECHNICAL FIELD

The present invention relates to a moth-eye film. More specifically, the present invention relates to a moth-eye film which, when adhered to a surface of a substrate, can reduce surface reflection of the substrate.

BACKGROUND ART

The art of reducing surface reflection of a display device having been attracting attention is a moth-eye structure which can provide an ultra-antireflection effect without conventional light interference films. A moth-eye structure, as described in Patent Literature 1, for example, is formed by arranging projection and recess patterns continuously on the surface of the target product of anti-reflection treatment. These patterns include projections arranged at intervals equal to or smaller than the visible light wavelength, which are smaller than the intervals in the projection and recess patterns formed on anti-glare (AG) films. The moth-eye structure with such patterns provide pseudo-continuous changes in the refractive index in the interface between the outside (air) and the product surface, so as to transmit almost all light regardless of the refractive index interface, almost perfectly eliminating light reflection on the product surface.

A film having such a moth-eye structure (hereinafter, also referred to as a moth-eye film) is applicable to various uses such as displays for devices (e.g. TVs, cellphones), measuring instruments (e.g. speedometers and fuel gauges for cars), and construction materials (e.g. windowpanes, road signs).

Such a moth-eye film needs to be adhered to the outermost surface of the product because it transmits light by pseudo elimination of changes in the refractive index in the air interface. For example, in the case that a moth-eye film is adhered to the surface of a windowpane, condensation occurs on the surface of the moth-eye film adhered to the windowpane as illustrated in FIG. 51 in the winter morning in which the outside air is cold, and the generated droplets of water flow down to cause stains at the bottom of the windowpane.

In addition to moth-eye films, various studies have been made on the method of preventing condensation on the surface of materials such as construction materials. These studies typically focus on the contact angle between the product surface and water (e.g. Patent Literature documents 2 to 6).

CITATION LIST

Patent Literature

Patent Literature 1: JP 4796659 B
Patent Literature 2: JP 2003-089975 A
Patent Literature 3: JP 2009-258487 A
Patent Literature 4: JP 2008-158293 A
Patent Literature 5: JP 2004-502625 T
Patent Literature 6: JP 2004-60162 A

SUMMARY OF INVENTION

Technical Problem

However, as a result of various studies on the method for preventing condensation on the surface of the moth-eye film adhered to the substrate, the present inventors have found that there are cases where condensation cannot be prevented by adjusting the contact angle of the surface of the moth-eye film with water to an appropriate value.

The present invention has been made in view of the above current state of the art, and aims to provide a moth-eye film on the surface of which condensation is not likely to occur.

Solution to Problem

The studies made by the present inventors show that condensation occurs because of the materials constituting the moth-eye film, not because of the shape of the moth-eye film. That is, if the properties of the materials constituting the moth-eye film satisfy the predetermined conditions, condensation can be effectively prevented regardless of the shape and the surface properties of the moth-eye film. According to the results of the studies by the present inventors, the moth-eye film is required to satisfy the following conditions to prevent condensation.

That is, one aspect of the present invention is a moth-eye film including: a resin composition that, when formed into a flat film, has a contact angle with water of larger than 5° but smaller than 31.3°, the contact angle measured between a surface of the flat film and a droplet of water dropped onto the surface of the flat film, after 100 msec from contact of the droplet and the surface.

Advantageous Effects of Invention

The moth-eye film of the present invention can provide an excellent low-reflection property on the product surface, and can prevent condensation.

DESCRIPTION OF EMBODIMENTS

The present invention will be described in more detail below with reference to the drawings based on embodiments which, however, are not intended to limit the scope of the present invention.

The "moth-eye film" herein is, specifically, a film having projections which are arranged such that the width between the top points of adjacent projections is smaller than the lower limit (380 nm) of the visible light wavelengths.

Embodiment 1

Figure 1:
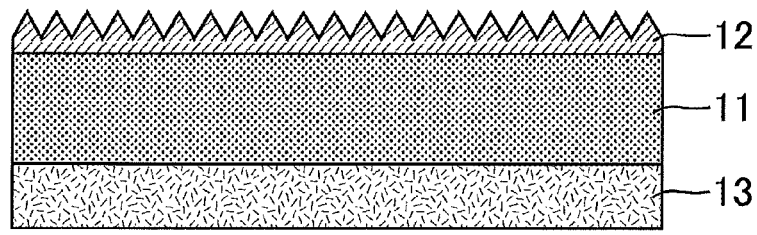
FIG. 1 is a schematic cross-sectional view of a laminate including a moth-eye film of Embodiment 1.

FIG. 1 is a schematic cross-sectional view of a laminate including a moth-eye film of Embodiment 1. As illustrated in FIG. 1, a moth-eye film 12 of Embodiment 1 is adhered to the target product of anti-reflection treatment with a base film 11 and an adhesive layer 13 therebetween. The moth-eye film 12 includes a projection/recess portion and a base portion. Almost all the light rays having entered the moth-eye film 12 from the surface are allowed to pass through the moth-eye film 12 to the product. The moth-eye film can therefore achieve a much better anti-reflection effect than a conventional anti-reflection film (e.g. light-interference film).

Suitable for the target product of anti-reflection treatment are products likely to be used at low temperatures, such as windowpanes in buildings, information displays, display windows, and front and rear windshields, instrument panels, and windowpanes of automobiles. The target product may also be, for example, a display for cellphones or the like products, an aquarium, a printed material, a photograph, a coated product, or a lighting apparatus.

The product may be made of any material on which the moth-eye film 12 can be placed, such as glass, plastics, and metals, and may be translucent or opaque. If the product is opaque, the moth-eye film 12 provides an anti-reflection effect for the surface of the opaque product. For example, if the product is black, the film provides a jet-black appearance, and if the product is in any other color, the film provides an appearance with high color purity. The film therefore provides a high design property to the product. The external form of the product may be any form such as a melt-molded product (e.g. a film, a sheet, an injection-molded product, a press-molded product).

When the moth-eye film is actually used for a product, the film is not necessarily adhered to the entire surface of the product to achieve a sufficient anti-reflection effect and a sufficient condensation prevention effect. For example, if the film is used for a windowpane, intentionally providing an area where the film is not adhered may further prevent condensation.

Hereinafter, the moth-eye film of Embodiment 1 is described in detail.

As illustrated in FIG. 1, the surface of the moth-eye film 12 includes projections which are arranged such that an interval between the top points of adjacent projections (width between adjacent projections in the case of a non-periodical structure) or a pitch between the top points of adjacent projections (width between adjacent projections in the case of a periodical structure) is equal to or smaller than the visible light wavelength. The width between the top points of adjacent projections in the projection/recess portion is equal to or smaller than the visible light wavelength, that is, the moth-eye film 12 has, on its surface, multiple projections arranged at an interval or a pitch equal to or smaller than the visible light wavelength (380 nm). The projections in Embodiment 1 are more preferred because they have an advantage that unnecessary diffraction rays are not generated if the projections are not regularly arranged (non-periodical structure). The moth-eye film 12 preferably has a thickness of 5 to 15 μm. The thickness is preferably at least 3 μm because a film with an excessively small thickness is susceptible to defects of a mold. The moth-eye film 12 may be provided with a protective film removable at the time of use of the product.

The material of the base film 11 is, for example, a polyolefin-based resin such as polypropylene, polymethylpentene, and a cyclic olefin-based polymer (e.g. norbornene-based resins such as those available under the trade name "ZEONOR" (from Zeon Corporation) and the trade name "ARTON" (from JSR Corporation)), triacetyl cellulose, polyethylene terephthalate, polycarbonate resin, polyethylene naphthalate, polyurethane, polyether ketone, polysulfone, polyether sulfone, polyester, polystyrene-based resin, or acrylic-based resin. On the surface of the base film 11, an anchor coat layer which provides enhanced adhesion between films, and/or a hard coat layer, for example, may be formed. The base film 11 is preferably thicker than the moth-eye film because if the base film 11 is thin, the laminate including the base film 11 and the moth-eye film 12 may be curled due to cure shrinkage of the resin constituting the moth-eye film.

The adhesive layer 13 may be made of any material. To the face of the adhesive layer 13 opposite to the face where the base film 11 is provided, a separator film (e.g. polyethylene terephthalate (PET)) for protection of the adhesive layer 13 may be adhered.

Hereinafter, the projections of the moth-eye film of Embodiment 1 are described in more detail.

Figure 2:
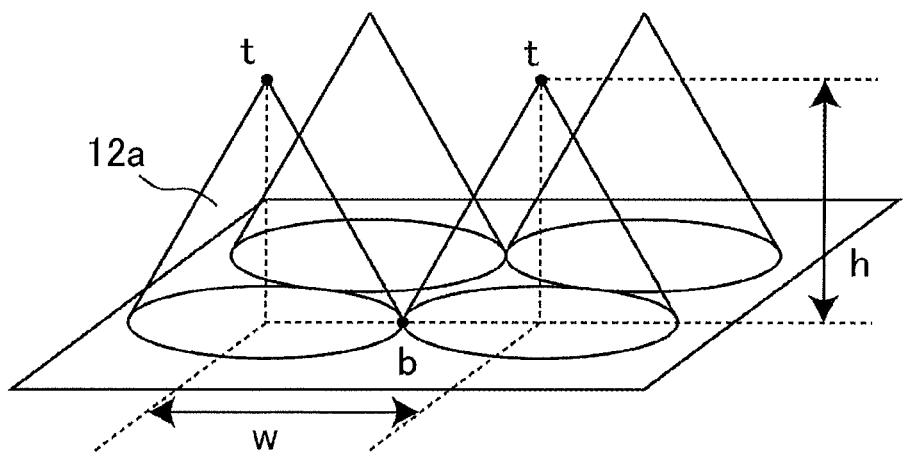
FIG. 2 is a schematic perspective view of the moth-eye film of Embodiment 1, illustrating a case where the unit structure of projections has a conical shape.
Figure 3:
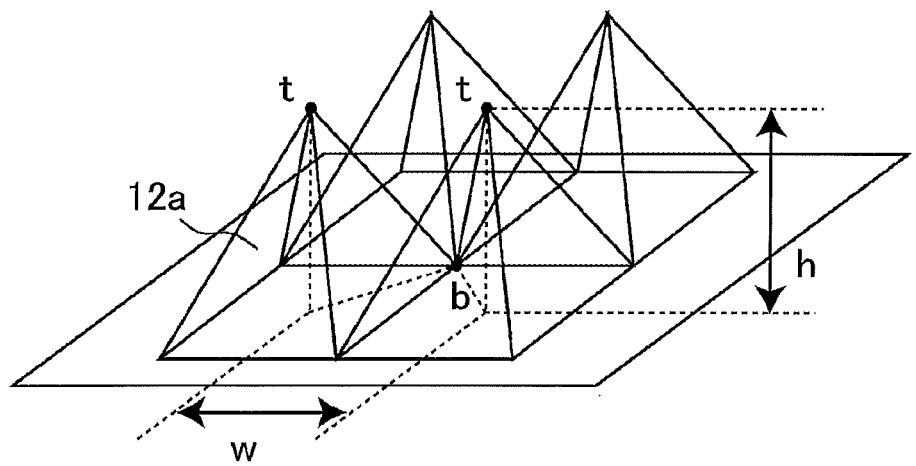
FIG. 3 is a schematic perspective view of the moth-eye film of Embodiment 1, illustrating a case where the unit structure of projections has a quadrangular pyramid shape.

FIG. 2 and FIG. 3 are each a schematic perspective view of the moth-eye film of Embodiment 1. FIG. 2 illustrates a case where the unit structure of projections has a conical shape, and FIG. 3 illustrates a case where the unit structure of projections has a quadrangular pyramid shape. As illustrated in FIG. 2 and FIG. 3, the top of a projection 12*a* is indicated as the top point t, and the point where the projections 12*a* come into contact with one another is indicated as the base point b. Also as illustrated in FIG. 2 and FIG. 3, the distance between two points obtained by drawing vertical lines from the top points t of the respective projections 12*a* to the same plane is indicated as the width w between the top points of the adjacent projections 12*a*. The distance of a vertical line from the top point t of a projection 12*a* to the plane where the bottom point b is located is indicated as the height h from the top point of the projection 12*a* to the bottom point.

Figure 4:
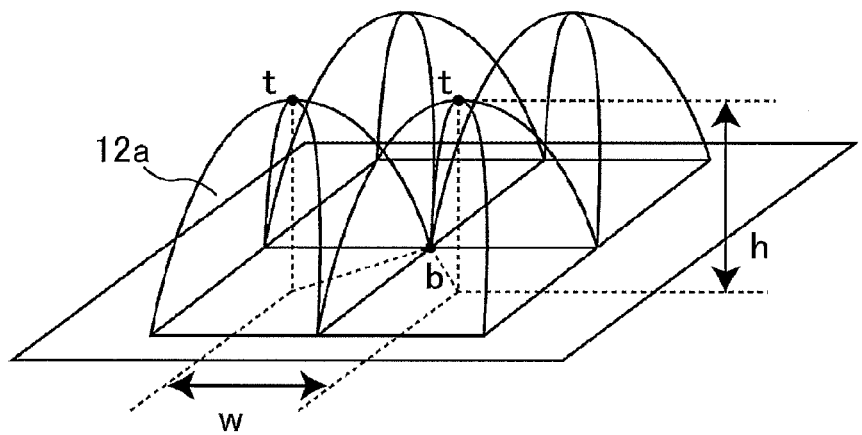
FIG. 4 is a schematic perspective view of the moth-eye film of Embodiment 1, illustrating a case where the unit structure of projections has a shape with a gentler slope at the top point than at the bottom point.
Figure 5:
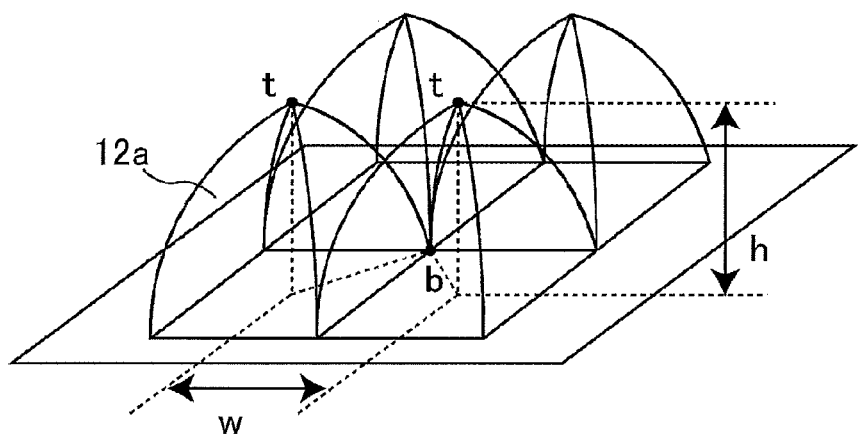
FIG. 5 is a schematic perspective view of the moth-eye film of Embodiment 1, illustrating another case where the unit structure of projections has another shape with a gentler slope at the top point than at the bottom point.
Figure 6:
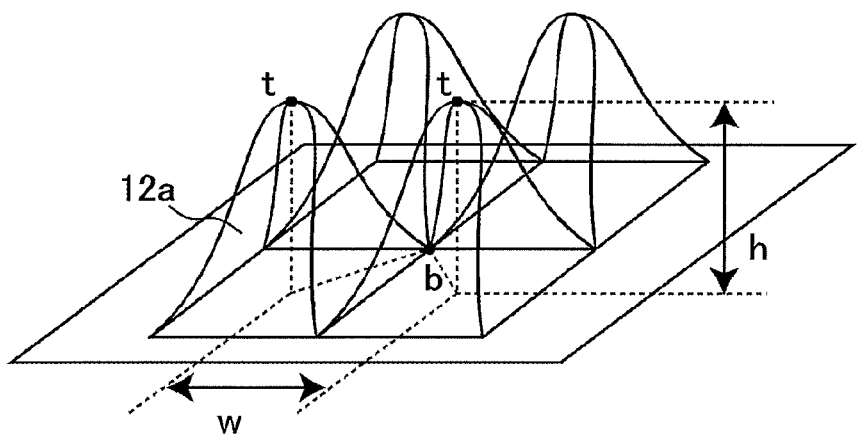
FIG. 6 is a schematic perspective view of the moth-eye film of Embodiment 1, illustrating a case where the unit structure of projections has a shape with a partly steep slope in a region between the bottom point and the top point.
Figure 7:
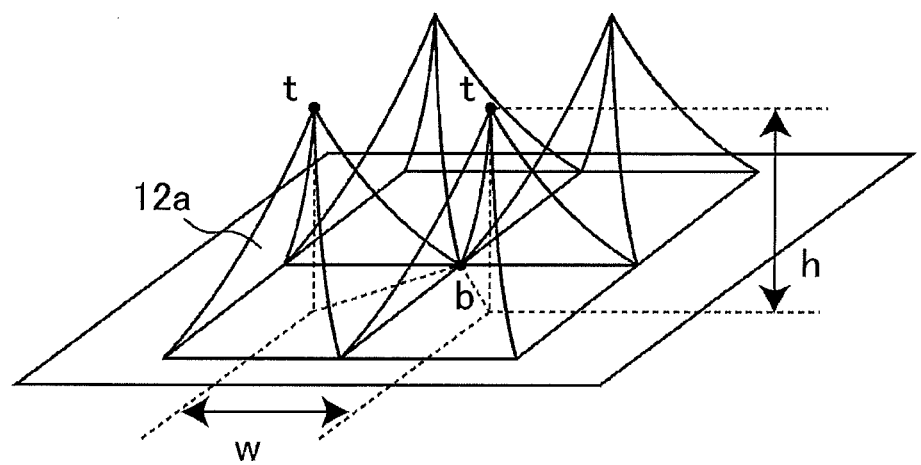
FIG. 7 is a schematic perspective view of the moth-eye film of Embodiment 1, illustrating a case where the unit structure of projections has a shape with a steeper slope at the top point than at the bottom point.

The moth-eye film of Embodiment 1 has a width w between the top points of the adjacent projections 12*a* of 380 nm or smaller, preferably 300 nm or smaller, and more preferably 200 nm or smaller. The exemplary unit structures of the projections 12*a* illustrated in FIG. 2 and FIG. 3 respectively have a conical shape and a quadrangular pyramid shape, but the unit structure of the projections on the surface of the moth-eye film of Embodiment 1 is not particularly limited if the projections each have a top point and a bottom point and are arranged such that the interval or pitch of the projections is controlled to be equal to or smaller than the visible light wavelength. For example, the unit structure may have a shape with a gentler slope at the top point than at the bottom point as illustrated in FIG. 4 and FIG. 5 (a hanging bell shape, a bell shape, or a dome shape), a shape with a partly steep slope in a region between the bottom point and the top point as illustrated in FIG. 6 (sine shape), a shape with a steeper slope at the top point than at the bottom point as illustrated in FIG. 7 (a needle shape or a tent shape), or a shape with stair-like steps on inclines of the conical shape and the quadrangular pyramid shape.

Figure 8:
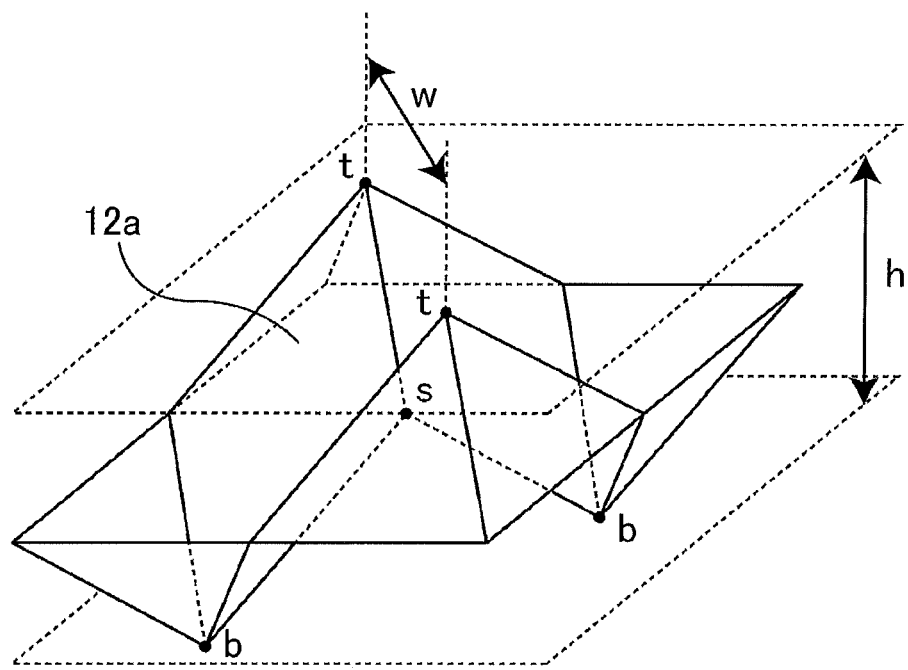
FIG. 8 is a schematic perspective view of the moth-eye film of Embodiment 1, illustrating a case where contact points of adjacent projections are at multiple heights, and a saddle and a saddle point are present between the adjacent projections.
Figure 9:
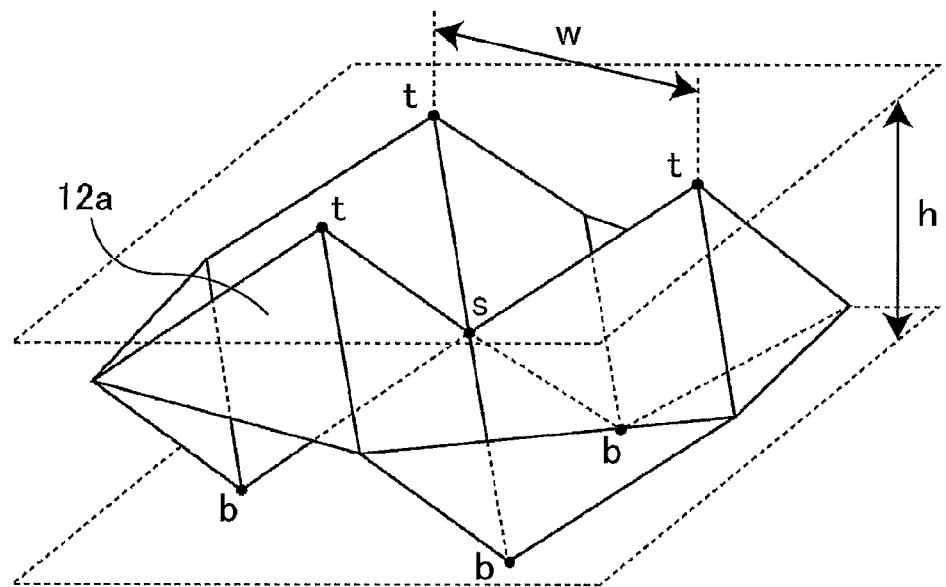
FIG. 9 is a schematic perspective view of the moth-eye film of Embodiment 1, illustrating another case where contact points of adjacent projections are at multiple heights, and a saddle and a saddle point are present between the adjacent projections.
Figure 10:
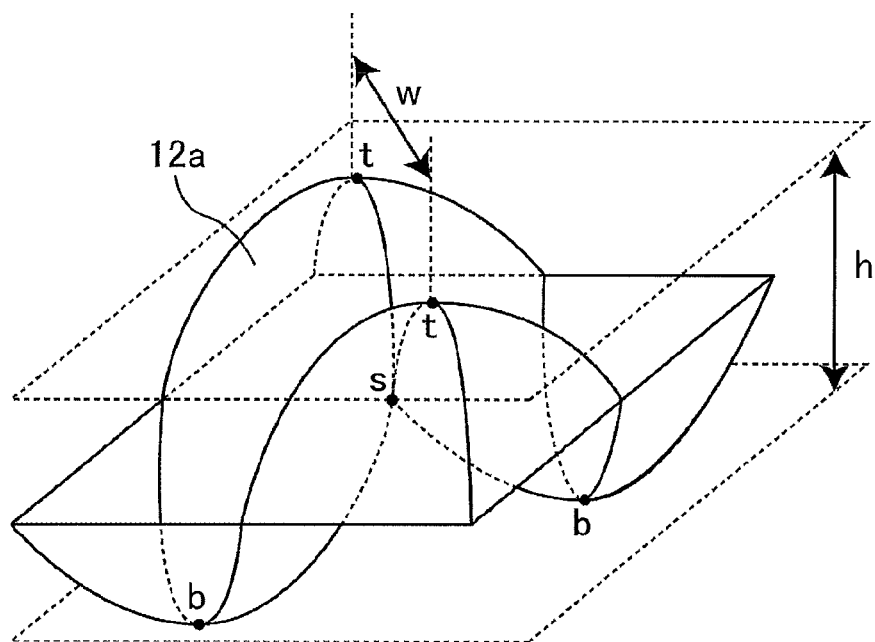
FIG. 10 is a schematic perspective view of the moth-eye film of Embodiment 1, illustrating yet another case where contact points of adjacent projections are at multiple heights, and a saddle and a saddle point are present between the adjacent projections.

In Embodiment 1, the projections may be in multiple arrangements, or may not be in any arrangement. That is, the bottom points of the adjacent projections 12*a*, which are the points where the projections 12*a* are in contact with one another, are not always at the same height. For example, as illustrated in FIG. 8 to FIG. 10, the heights of the points (contact points) on the surface where the projections 12*a* are in contact with one another may vary. These forms include a saddle. A saddle means a depression in a mountain ridge (Kojien, fifth edition). Here, with a focus on a projection having one top point t, the projection has multiple contact points located lower than the top point t which form saddles. The contact point at the lowest position around one projection herein is indicated as a base point b, and a point which is located lower than the top point t and higher than the bottom point b, and corresponds to a point of equilibrium of the saddle is indicated as a saddle point s. In this case, the width w between the top points of the projections 12a corresponds to the distance between the top points, and the height h corresponds to the distance from the top point to the bottom point in the vertical direction.

Figure 11:
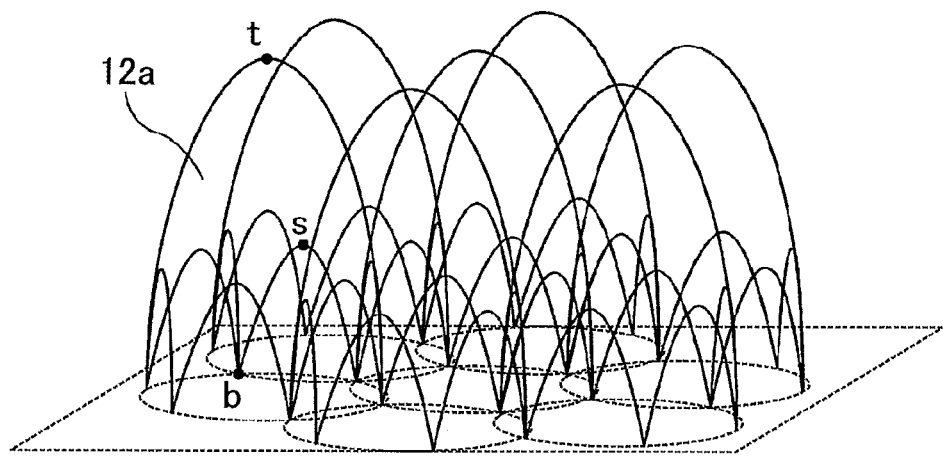
FIG. 11 is a schematic perspective view illustrating the details of the projections of a moth-eye film, and is an enlarged view in the case that the projections have a bell shape and have saddles and saddle points.
Figure 12:
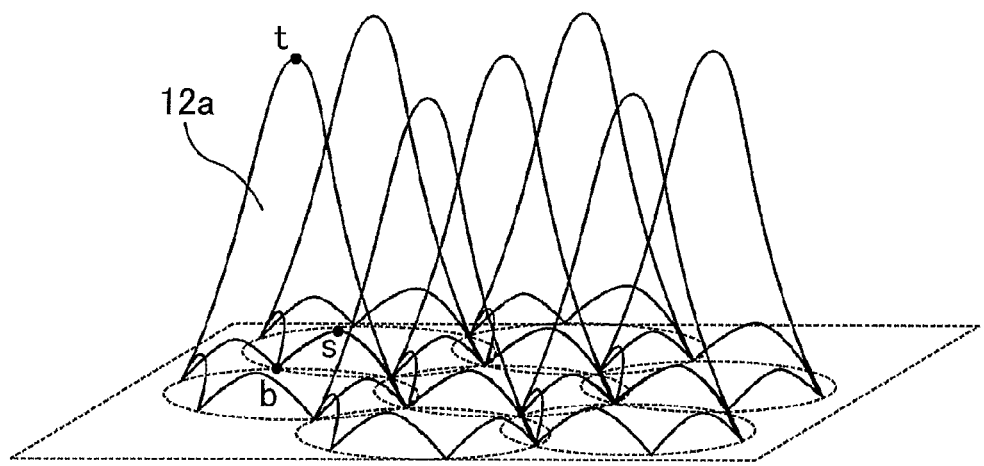
FIG. 12 is a schematic perspective view illustrating the details of the projections of a moth-eye film, and is an enlarged view in the case that the projections have a needle shape and have saddles and saddle points.

Hereinafter, these points are described in more detail. Specifically, the points are described based on an example in which with a focus on a projection having one top point t, the projection has multiple contact points with the neighboring projections which are located lower than the top point t and form saddles (saddle points). FIG. 11 and FIG. 12 are schematic perspective views each illustrating the details of the projections of a moth-eye film. FIG. 11 is an enlarged view in the case that the projections have a hanging bell shape and include saddles and saddle points, and FIG. 12 is an enlarged view in the case that the projections have a needle shape and include saddles and saddle points. As illustrated in FIG. 11 and FIG. 12, with a focus on one top point t of the projection 12a, the projection has multiple contact points with neighboring projections which are located lower than the top point t, that is, the projection has saddles. Also, comparison of FIG. 11 and FIG. 12 shows that the saddles tend to be formed at a higher position in a hanging bell shape than in a needle shape.

Figure 13:
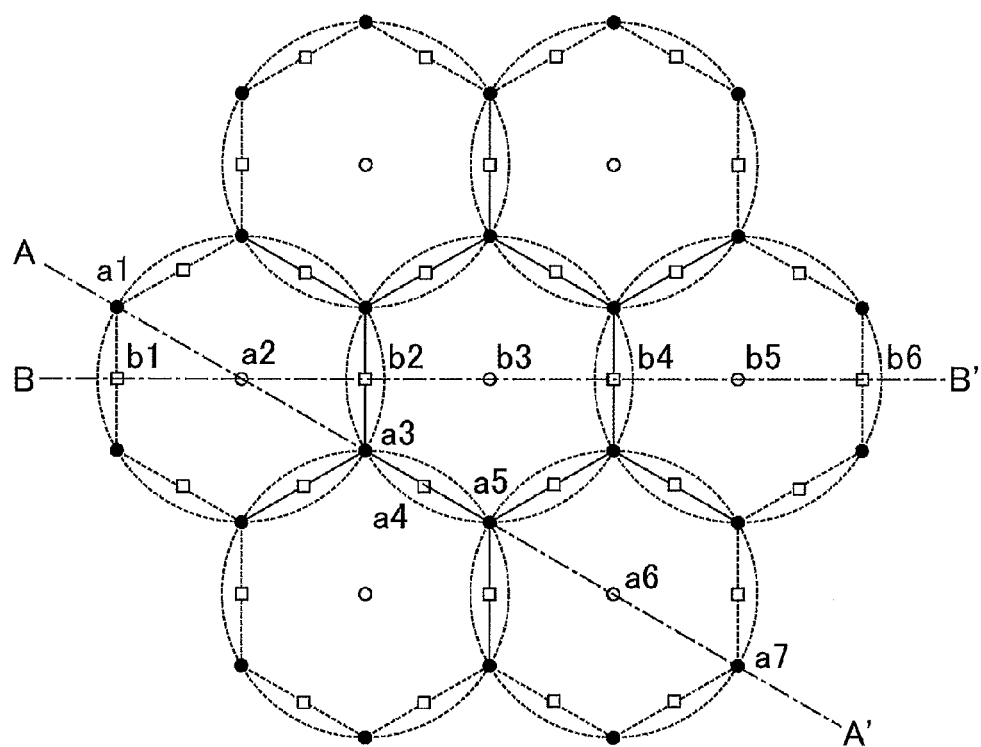
FIG. 13 is a schematic plan view obtained by enlarging the projections and recesses of the moth-eye structure.

FIG. 13 is schematic plan view obtained by enlarging the projections and recesses of the moth-eye structure. In FIG. 13, the white dots (○) represent the peak points, the black dots (•) represent the bottom points, and the white rectangles (□) represent the saddle points of the saddles. As illustrated in FIG. 13, the bottom points and the saddle points are formed on a concentric circle with one top point as the center. Although FIG. 13 schematically illustrates circles on each of which six bottom points and six saddle points are drawn, the actual formation is not limited to this formation and includes more irregular formations.

Figure 14:
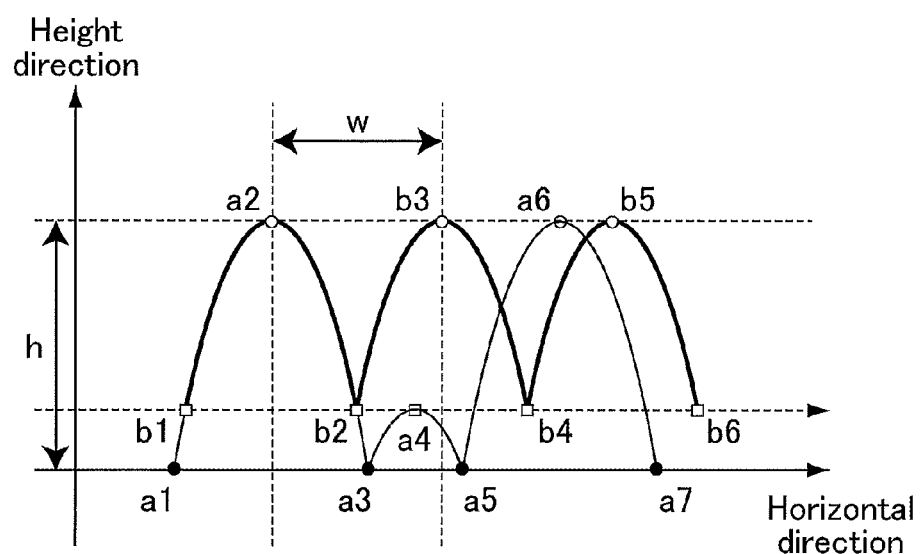
FIG. 14 is a schematic view illustrating the cross section along the A-A' line in FIG. 13 and the cross section along the B-B' line in FIG. 13.

FIG. 14 is a schematic view illustrating the cross section along the A-A' line in FIG. 13 and the cross section along the B-B' line in FIG. 13. Here, the top points are indicated as a2, b3, a6, and b5, the saddles are indicated as b1, b2, a4, b4, and b6, and the bottom points are indicated as a1, a3, a5, and a7. At this time, the relation between a2 and b3 and the relation between b3 and b5 represent the relations between the adjacent top points. The distance between a2 and b3 and the distance between b3 and b5 correspond to the distances w between the top points of the adjacent projections. The height between a2 and a1 or a3, or the height between a6 and a5 or a7 corresponds to the height h of a projection.

Figure 15:
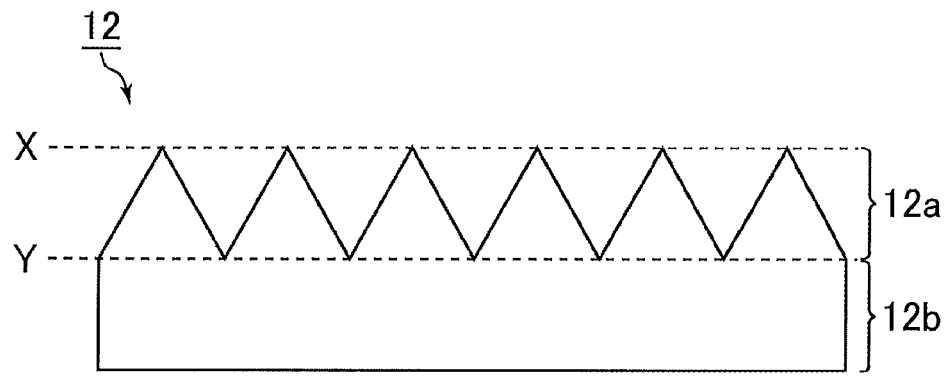
FIG. 15 is a schematic view of a cross-sectional structure of the moth-eye film, illustrating the principle for realizing low reflection of the moth-eye film of Embodiment 1.
Figure 16:
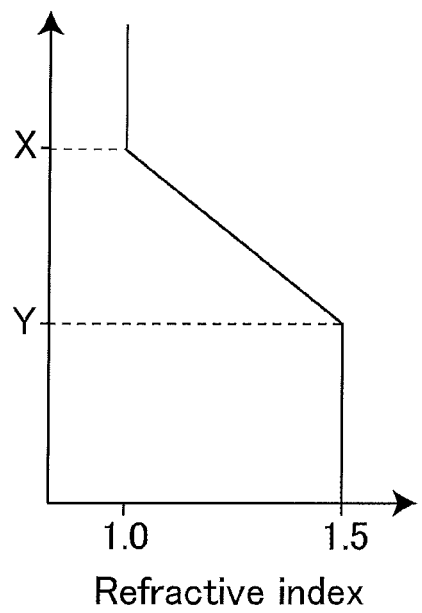
FIG. 16 is a schematic view of a change in the apparent refractive index of light that enters the moth-eye film, illustrating the principle for realizing low reflection of the moth-eye film of Embodiment 1.

Here, the principle that the moth-eye film of Embodiment 1 provides low reflection is described. FIG. 15 and FIG. 16 are schematic views each showing the principle that the moth-eye film of Embodiment 1 provides low reflection. FIG. 15 illustrates a cross-sectional structure of a moth-eye film, and FIG. 16 illustrates a change in the apparent refractive index (effective refractive index) of light that enters the moth-eye film. As illustrated in FIG. 15 and FIG. 16, the moth-eye film 12 of Embodiment 1 includes the projection 12a and the base portion 12b. When light travels from one medium to another medium, the light is refracted, transmitted, and reflected in the interface of these media. The degree of these phenomena such as refraction is determined based on the refractive index of the medium through which the light travels. For example, the air has a refractive index of about 1.0, and a resin has a refractive index of about 1.5. In Embodiment 1, the projection/recess unit structures formed on the surface of the moth-eye film 12 have a substantially conical shape, i.e. a shape with a gradually decreasing width toward the top. Accordingly, as illustrated in FIG. 15 and FIG. 16, the refractive index is regarded as gradually, continuously increasing from about 1.0 (refractive index of air) to the refractive index of the film-forming material (in the case of a resin, about 1.5) in the projection 12a (the X-Y region) located in the interface between the air layer and the moth-eye film 12. Since the amount of light reflection depends on the difference in the refractive indexes between the media, simulatively eliminating the refractive interface of light as described above allows almost all the light rays to pass through the moth-eye film 12, thereby greatly decreasing the reflectance on the film surface. Although FIG. 15 illustrates a substantially conical projection/recess structure as an example, the projection/recess structure is of course not limited thereto, and may be any projection/recess structure that provides an anti-reflection effect of a moth-eye structure according to the above principle.

Suitable examples of the profile of multiple projections on the surface of the moth-eye film 12 include a form with a width (interval or pitch) between adjacent projections of from 20 nm to 200 nm inclusive and a height of each projection of from 50 nm to 400 nm inclusive, from the viewpoints of optical properties, mechanical properties, and production. Although FIG. 1 to FIG. 15 each illustrate a form in which the projections 12a are repeating units entirely arranged in cycles equal to or smaller than the visible light wavelength, part of the projections may lack periodicity, and the projections may have no periodicity as a whole. Also, the width of any one projection of the multiple projections may be different from the widths of the adjacent multiple projections. A form with no periodicity is advantageous in terms of the performance because it is not likely to cause diffraction scattering by transmission and reflection due to a regular arrangement, and in terms of production that the patterns can be easily produced. Also, as illustrated in FIG. 8 to FIG. 14, the moth-eye film 12 may have multiple bottom points at different heights around one projection. The moth-eye film 12 may also have micron-order or higher order projections and recesses larger than nano-order projections and recesses on the surface, i.e., have a double projection/recess structure.

Hereinafter, one example of the method for forming the moth-eye film 12 is described. First, a glass substrate is prepared, and aluminum (Al) used as the material of a mold is deposited on the glass substrate by sputtering. Next, the step of anodically oxidizing aluminum and immediately etching the aluminum is repeated, so that an anodic oxidation layer is formed which includes a large number of fine holes with a distance between the bottom points of the adjacent holes (recesses) being equal to or smaller than the visible light wavelength. For example, a mold can be produced by a flow of performing anodic oxidation, etching, anodic oxidation, etching, anodic oxidation, etching, anodic oxidation, etching, and anodic oxidation in the stated order (five times of anodic oxidation, four times of etching). Such a step of repeating anodic oxidation and etching gives a shape tapering toward the inside of the mold (tapered shape) to the fine holes formed. Here, adjusting the time for anodic oxidation differentiates the size (depth) of the holes formed. The substrate of the mold is not limited to glass, and may be a metal material such as stainless steel (SUS) and nickel (Ni), or a resin material such as a polyolefin-based resin (e.g. polypropylene, polymethylpentene, cyclic olefin-based polymers, representative examples of the cyclic olefin-based polymers including "ZEONOR" (from Zeon Corporation) and "ARTON" (from JSR Corporation), both being norbornene resins), a polycarbonate resin, polyethylene terephthalate, polyethylene naphthalate, and triacetyl cellulose. In place of a substrate on which a film of aluminum is formed, a bulk aluminum substrate may be used. The form of the mold may be a plate or a roll (cylinder).

Next, on the surface of the mold produced by such a production step, a light-transmissive 2P (photo-polymerizable) resin solution is dropped. Then, to a 2P resin layer formed from the 2P resin solution, a substrate (e.g. TAC film) is adhered. The 2P resin layer is irradiated with ultraviolet (UV) light (e.g. 2 J/cm$^2$) to be cured. The laminate of the resulting cured 2P resin film and the TAC film is then peeled off from the mold. The specific method for forming (duplicating) fine projections and recesses on the substrate using a mold can be appropriately selected from various methods including the 2P (photo-polymerization) method described above, duplication methods (e.g. heat pressing method (embossing method), injection molding method, and sol-gel method), a method of laminating a fine projection/recess pattern sheet, and a method of transferring a fine projection/recess layer, according to the use of the anti-reflection product and the material of the substrate.

The depth of the recesses of the mold and the height of the projections of the moth-eye film can be measured using a scanning electron microscope (SEM). The contact angle of the surface of the moth-eye film or the flat film with water can be measured using a contact angle meter.

Hereinafter, the material for forming a moth-eye film is described in detail.

The material for forming a moth-eye film of Embodiment 1 is a resin composition containing components curable by active energy rays (e.g. light, electron rays) having certain properties, or by heat, for example. Examples of such curable components include monomers and oligomers polymerizable by active energy rays and/or heat. The resin composition may further contain additives for improving properties including wettability (slippage), rigidity, and abrasion resistance, such as slipping agents (surfactants), anti-abrasion agents, hydrophilic substances, and polymerization initiators.

Examples of the slipping agents include hydrocarbon surfactants, silicone surfactants, and fluorosurfactants. In particular, fluorosurfactants are suitable. Specific examples of the fluorosurfactants include surfactants containing a group such as a perfluoroalkyl group and a perfluoroalkenyl group in a molecule.

Adjusting the kinds of the components constituting the resin composition, the composition ratio, and additives enables production of a resin composition having the desired properties. Also, a moth-eye film produced using such a resin composition can provide an excellent effect of preventing condensation.

Here, although it is not directly related to the effect of preventing condensation, the moth-eye film may be subjected to hydrophilic treatment or water repellent treatment on its surface. However, as described later, the hydrophilic treatment or water repellent treatment on the surface may possibly reduce the effect of preventing condensation, and in such a case, these treatments cannot be employed. Whether or not the effect of preventing condensation is reduced can be determined by the contact angle of the surface of the formed flat film with water as described below.

The monomers and/or oligomers polymerizable by active energy rays may be any monomers and/or oligomers that are polymerized into polymers by irradiation of active energy rays such as ultraviolet rays, visible energy rays, and infrared rays, regardless of being organic or inorganic, in the presence or absence of photopolymerization initiators. These monomers and/or oligomers may be, for example, radically polymerizable, anionically polymerizable, or cationically polymerizable. Examples of the monomers and/or oligomers include monomers and/or oligomers having, in a molecule, a vinyl group, a vinylidene group, an acryloyl group, or a methacryloyl group (hereinafter, an acryloyl group and a methacryloyl group together may be referred to as a (meth)acryloyl group, and the same applies to the expressions such as a (meth)acrylic compound and a (meth)acrylate). In particular, monomers and/or oligomers containing a (meth)acryloyl group are preferred, for a high rate of polymerization by irradiation of the active energy rays. The resin compositions curable by active energy rays may include a nonreactive polymer, and an active energy sol-gel reaction composition.

Examples of the monomers polymerizable by active energy rays include monofunctional monomers such as ethyl (meth)acrylate, n-butyl (meth)acrylate, isobutyl (meth)acrylate, t-butyl (meth)acrylate, hexyl (meth)acrylate, 2-ethylhexyl (meth)acrylate, lauryl (meth)acrylate, stearyl (meth)acrylate, phenyl (meth)acrylate, phenyl cellosolve (meth)acrylate, nonyl phenoxy polyethylene glycol (meth)acrylate, isobornyl (meth)acrylate, dicyclopentanyl (meth)acrylate, and dicyclopentenyloxy ether (meth)acrylate;

bifunctional monomers such as 1,6-hexanediol di(meth)acrylate, polypropylene glycol di(meth)acrylate, neopentyl glycol hydroxypivalate di(meth)acrylate, neopentyl glycol di(meth)acrylate, 3-acryloyloxy glycerol monomethacrylate, 2,2'-bis(4-(meth)acryloyloxypolyethylene oxyphenyl)propane, 2,2'-bis(4-(meth)acryloyloxypolypropylene oxyphenyl)propane, dicyclopentanyl di(meth)acrylate, bis[(meth)acryloyloxyethyl]hydroxyethyl isocyanate, phenyl glycidyl ether acrylate tolylene diisocyanate, and divinyl adipate;

trifunctional monomers such as trimethylolpropane tri(meth)acrylate, trimethylolethane tri(meth)acrylate, tris[(meth)acryloyloxyethyl]isocyanate, and pentaerythritol tri(meth)acrylate;

tetrafunctional monomers such as pentaerythritol tetra(meth)acrylate and glycerol di(meth)acrylate hexamethylene diisocyanate;

pentafunctional monomers such as dipentaerythritolmonohydroxy penta(meth)acrylate;

hexafunctional monomers such as dipentaerythritol hexa(meth)acrylate.

The oligomers polymerizable by active energy rays are oligomers containing polymerizable functional groups which are polymerizable by active energy rays, and the oligomer preferably has a molecular weight of 500 to 50000. Examples of such oligomers include (meth)acrylic acid esters of epoxy resin (e.g. bisphenol A-diepoxy-(meth)acrylic acid adducts), (meth)acrylic acid esters of polyether resin, (meth)acrylic acid esters of polybutadiene resin, and polyurethane resins having a (meth)acrylic group at a molecular terminal.

These monomers and/or oligomers polymerizable by active energy rays may be used alone or in combination. For example, monomers may be combined, oligomers may be combined, or monomers and oligomers may be combined.

Selecting the monomers and/or oligomers polymerizable by active energy rays may enable free control of the crosslinking density of a moth-eye structure of a surface hydrophilic molded product (i.e. cured shaped product formed from monomers and/or oligomers polymerizable by active energy rays).

Examples of the polymerization initiator include photopolymerization initiators that are active to light and capable of polymerizing monomers and/or oligomers and hydrophilic monomers and/or hydrophilic oligomers. More specifically, radical polymerization initiators, anionic polymerization initiators, and cationic polymerization initiators can be used. Examples of such photopolymerization initiators include acetophenones such as p-tert-butyl trichloroacetophenone, 2,2'-diethoxy acetophenone, and 2-hydroxy-2-methyl-1-phenylpropan-1-one; ketones such as benzophenone, 4,4'-bis-dimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; and benzyl ketals such as benzyl dimethyl ketal and hydroxycyclohexyl phenyl ketone.

The hydrophilic monomers and/or hydrophilic oligomers are the monomers and/or oligomers which have a hydrophilic group in a molecule. Examples of the hydrophilic group include nonionic hydrophilic groups such as polyethylene glycol groups, polyoxymethylene groups, hydroxy groups, sugar-containing groups, amide groups, and pyrrolidone groups; anionic hydrophilic groups such as carboxyl groups, sulfone groups, and phosphoric acid groups; cationic hydrophilic groups such as amino groups and ammonium groups; and zwitterion groups such as amino acid-containing groups and phosphoric acid groups/ammonium ion groups. The examples also include derivatives of the above groups, such as N-substituted derivatives of amino groups, amide groups, ammonium groups, or pyrrolidone groups. The hydrophilic monomers and/or hydrophilic oligomers may have single or multiple hydrophilic groups in a molecule, and may have multiple kinds of hydrophilic groups.

Examples of the hydrophilic monomers and/or hydrophilic oligomers include hydroxy group-containing monomers such as 2-hydroxyethyl (meth)acrylate, 2-hydroxypropyl (meth) acrylate, and glycerol mono(meth)acrylate;

monomers having polyethylene glycol structural units, such as diethylene glycol mono(meth)acrylate, triethylene glycol mono(meth)acrylate, tetraethylene glycol mono (meth)acrylate, nonaethylene glycol mono(meth)acrylate, tetradecaethylene glycol mono(meth)acrylate, trieicosaethylene glycol mono(meth)acrylate, polyethylene glycol mono (meth)acrylate, methoxydiethylene glycol (meth)acrylate, methoxytriethylene glycol (meth)acrylate, methoxytetraethylene glycol (meth)acrylate, methoxynonaethylene glycol (meth)acrylate, methoxytetradecaethylene glycol (meth) acrylate, methoxytrieicosaethylene glycol (meth)acrylate, methoxypolyethylene glycol (meth)acrylate, phenoxydiethylene glycol (meth)acrylate, phenoxytetraethylene glycol (meth)acrylate, phenoxyhexaethylene glycol (meth)acrylate, phenoxynonaethylene glycol (meth)acrylate, and phenoxypolyethylene glycol (meth)acrylate;

monomers containing amide groups, such as N-ethyl (meth)acrylamide, N-n-propyl (meth)acrylamide, N-isopropyl (meth)acrylamide, N-cyclopropyl (meth)acrylamide, N-methyl-N-ethyl (meth)acrylamide, N,N-dimethyl (meth) acrylamide, N,N-diethyl (meth)acrylamide, N-methyl-N-isopropyl (meth)acrylamide, N-methyl-N-n-propyl (meth) acrylamide, N-(meth)acryloyl morpholine, N-(meth)acryloyl pyrrolidine, N-(meth)acryloyl piperidine, N-vinyl-2-pyrrolidone, N-methylene bisacrylamide, N-methoxypropyl (meth) acrylamide, N-isopropoxypropyl (meth)acrylamide, N-ethoxypropyl (meth)acrylamide, N-1-methoxymethylpropyl (meth)acrylamide, N-methoxyethoxypropyl (meth)acrylamide, N-1-methyl-2-methoxyethyl (meth)acrylamide, N-methyl-N-n-propyl (meth)acrylamide, and N-(1,3-dioxolan-2-yl) (meth)acrylamide;

monomers containing amino groups, such as N,N-dimethylaminoethyl (meth)acrylate, N,N-dimethylaminopropyl (meth)acrylamide, N,N-(bismethoxymethyl) carbamyloxyethyl methacrylate and N-methoxymethylcarbamyloxyethyl methacrylate;

monomers containing carboxyl groups, such as 2-(meth) acryloyloxyethyl phthalic acid, 2-(meth)acryloyloxypropyl phthalic acid, and 2-(meth)acryloyloxyethyl succinic acid;

monomers containing phosphoric acid groups, such as mono(2-methacryloyloxyethyl) acid phosphate and mono(2-acryloyloxyethyl) acid phosphate;

monomers containing quaternary-ammonium salt groups, such as (meth)acryloyloxyethyl trimethyl ammonium chloride and (meth)acryloyloxypropyl trimethyl ammonium chloride;

monomers containing sulfone groups, such as 2-acrylamido-2-methylpropanesulfonic acid, 2-acrylamide 2-phenylpropanesulfonic acid, sodium (meth)acryloyloxyethyl sulfonate, ammonium (meth)acryloyloxyethyl sulfonate, allylsulfonic acid, methallyl sulfonic acid, vinylsulfonic acid, styrene sulfonic acid, and sulfonic acid soda ethoxy methacrylate; and polymerizable oligomers having these hydrophilic groups and a molecular weight of 500 to 50000. The hydrophilic monomers and/or hydrophilic oligomers may be (meth) acrylic monomers and/or oligomers having an amino acid skeleton in a molecule. Also, the hydrophilic monomers and/ or hydrophilic oligomers may be (meth)acrylic monomers and/or oligomers having a sugar skeleton in a molecule.

Evaluation Test 1

In order to verify the effect of preventing condensation, experiments were performed using samples A to H and M actually prepared in accordance with the method for producing a moth-eye film of Embodiment 1. As references, samples I, J, and N including a flat film without a moth-eye structure were actually prepared using the respective resins used for the above samples. Also, as other references, a glass plate having no resin film on the surface and a black acrylic plate were respectively prepared as a sample K and a sample L.

The resin compositions actually used in production of the above respective samples were four kinds of resins, namely a resin composition a, a resin composition b, a resin composition c, and a resin composition d. The components of the resin composition a are urethane methacrylate (26% by mass), ester methacrylate (70% by mass), polyethylene glycol (2% by mass), and a silicone-based slipping agent (2% by mass). The components of the resin composition b are urethane methacrylate (36% by mass), ester methacrylate (57% by mass), polyethylene glycol (5% by mass), and a fluorine-based slipping agent (2% by mass). The resin composition c is the same as the resin composition a in terms of the components, but is different from the resin composition a in that the resin composition c has a thin film of a fluorine-based water repellent material on its surface. The film of a fluorine-based water repellent material was formed in vacuum such that the thickness was 30 nm. The components of the resin composition d are ester methacrylate (98% by mass) and polyethylene glycol (2% by mass). The silicone-based slipping agent used was KP-323 (Shin-Etsu Chemical Co., Ltd.), and the fluorine-based slipping agent used was Ftergent (NEOS Company Limited.).

The proportions of the components of the resin compositions a to d are collectively shown in the following Table 1.

TABLE 1

|  | Resin composition a | Resin composition b | Resin composition c | Resin composition d |
|---|---|---|---|---|
| Urethane methacrylate | 26 wt % | 36 wt % | 26 wt % | — |

TABLE 1-continued

|  | Resin composition a | Resin composition b | Resin composition c | Resin composition d |
| --- | --- | --- | --- | --- |
| Ester methacrylate | 70 wt % | 57 wt % | 70 wt % | 98 wt % |
| Polyethylene glycol | 2 wt % | 5 wt % | 2 wt % | 2 wt % |
| Silicone-based slipping agent | 2 wt % | — | 2 wt % | — |
| Fluorine-based slipping agent | — | 2 wt % | — | — |
| Note | — | — | Water repellent surface coating | — |
| Contact angle as material | 31.3° | 12.2° | — | 62.1° |

The amount of the slipping agent (surfactant) added is preferably 0.1 to 10% by mass, and more preferably 0.5 to 5% by mass, of the entire resin composition. The lower limit is determined in consideration of the degree of condensation prevention performance. The condensation prevention performance decreases as the amount added decreases. The upper limit is determined in consideration of the possibilities of inclusion of air bubbles and leakage (bleeding) of the materials in the reliability test. The inclusion of air bubbles is more likely to occur during application of the resin composition to form structural defects of the resulting moth-eye film as the amount added increases. Also, the possibility of leakage (bleeding) of materials from the cured moth-eye film increases during long-term storage as the amount added increases.

The samples have the following features. The thickness of the moth-eye film was about 5 μm. The base film used was a triacetyl cellulose (TAC) film with a thickness of about 80 μm. In the case that the moth-eye film is adhered to a glass plate or a black acrylic plate, the thickness of the adhesive layer was about 20 μm. The glass plate and the black acrylic plate used each had a thickness of 0.7 to 1.1 mm. Each sample was obtained by adhering a laminate including a moth-eye film with sides of about 5 to 7 cm to a glass plate or a black acrylic plate with sides of about 7 to 15 cm.

In the measurement of the contact angle, a contact angle meter PCA-1 (Kyowa Interface Science Co., Ltd.) was used. In consideration of temporal spread of water, the angle was measured after 100 msec from contact of the droplet on the surface in every measurement. The measurement was performed in an environment with a room temperature of 25° C. and a humidity of 45%. The size of the droplet was about 1.0 μl. FIGS. 17 to 28 each are a photograph showing the measurement of the contact angle on a sample.

Figure 17:
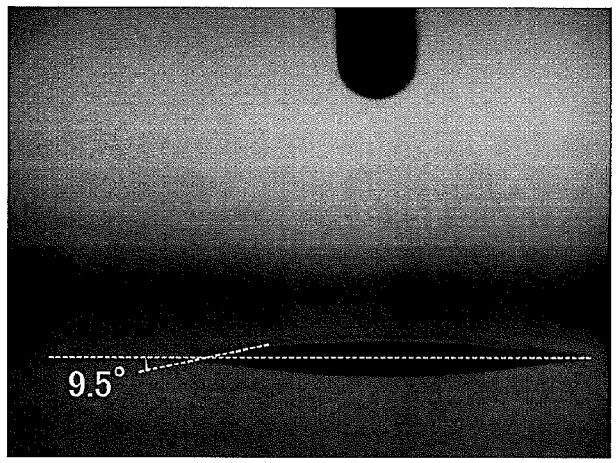
FIG. 17 is a photograph showing measurement of the contact angle on a sample A.

The sample A is an example in which a moth-eye film was formed on a glass plate. The moth-eye film was obtained from the resin composition a. The pitch (width between adjacent projections) of the moth-eye film is 100 nm, and the height of each projection is 180 nm. As shown in FIG. 17, the contact angle of the surface of the moth-eye film with water in the sample A was 9.5°.

Figure 18:
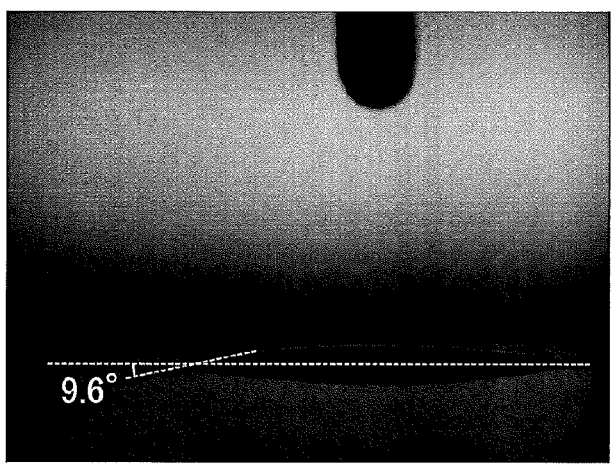
FIG. 18 is a photograph showing measurement of the contact angle on a sample B.

The sample B is an example in which a moth-eye film was formed on a black acrylic plate. The moth-eye film was obtained from the resin composition a. The pitch (width between adjacent projections) of the moth-eye film is 100 nm, and the height of each projection is 180 nm. As shown in FIG. 18, the contact angle of the surface of the moth-eye film with water in the sample B was 9.6°.

The sample C is an example in which a moth-eye film was formed on a glass plate. The moth-eye film was obtained from the resin composition a. The pitch (width between adjacent projections) of the moth-eye film is 200 nm, and the height of each projection is 180 nm. Although not measured, the contact angle of the surface of the moth-eye film with water in the sample C is considered to be almost the same as that in the sample D.

Figure 19:
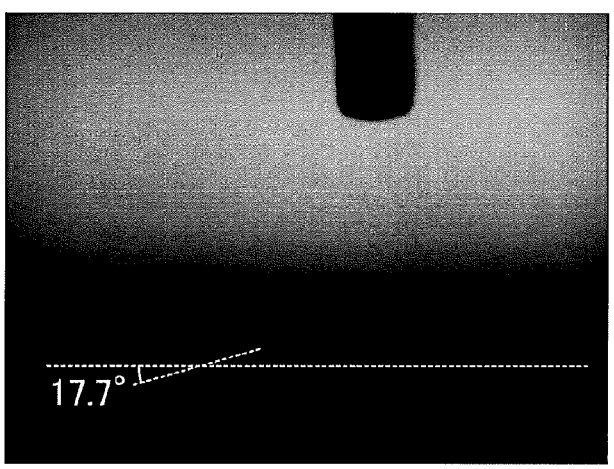
FIG. 19 is a photograph showing measurement of the contact angle on a sample D.

The sample D is an example in which a moth-eye film was formed on a black acrylic plate. The moth-eye film was obtained from the resin composition a. The pitch (width between adjacent projections) of the moth-eye film is 200 nm, and the height of each projection is 180 nm. As shown in FIG. 19, the contact angle of the surface of the moth-eye film with water in the sample D was 17.7°.

The sample E is an example in which a moth-eye film was formed on a glass plate. The moth-eye film was obtained from the resin composition b. The pitch (width between adjacent projections) of the moth-eye film is 200 nm, and the height of each projection is 180 nm. Although not measured, the contact angle of the surface of the moth-eye film with water in the sample E is considered to be almost the same as that in the sample F.

Figure 20:
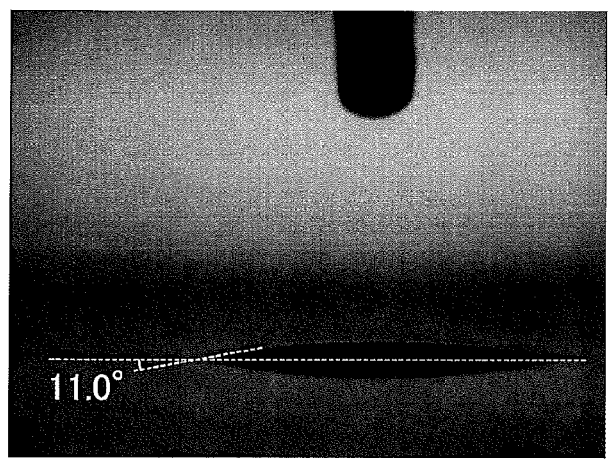
FIG. 20 is a photograph showing measurement of the contact angle on a sample F.

The sample F is an example in which a moth-eye film was formed on a black acrylic plate. The moth-eye film was obtained from the resin composition b. The pitch (width between adjacent projections) of the moth-eye film is 200 nm, and the height of each projection is 180 nm. As shown in FIG. 20, the contact angle of the surface of the moth-eye film with water in the sample F was 11.0°.

Figure 21:
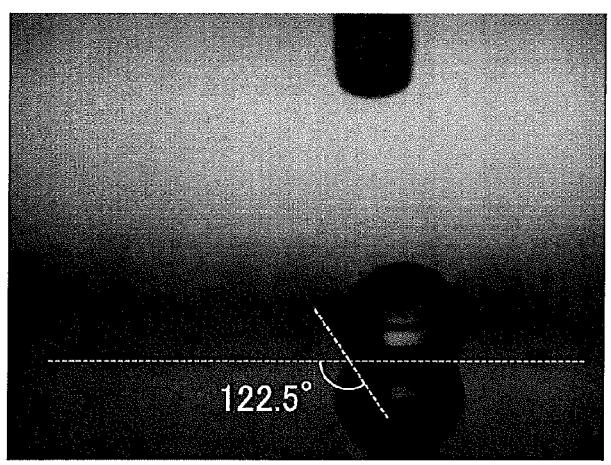
FIG. 21 is a photograph showing measurement of the contact angle on a sample G.

The sample G is an example in which a moth-eye film was formed on a black acrylic plate. The moth-eye film was obtained from the resin composition c. The pitch (width between adjacent projections) of the moth-eye film is 100 nm, and the height of each projection is 180 nm. As shown in FIG. 21, the contact angle of the surface of the moth-eye film with water in the sample G was 122.5°.

Figure 22:
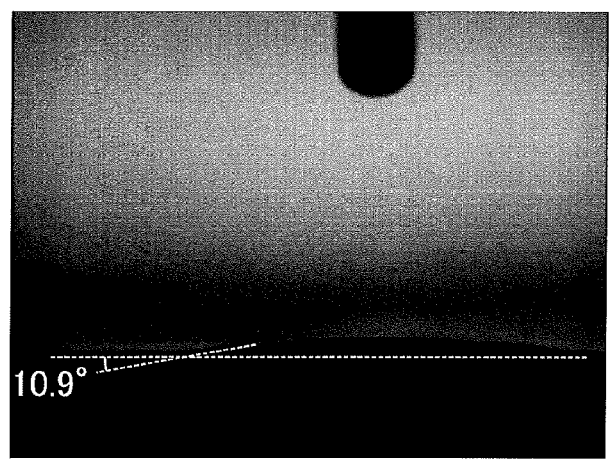
FIG. 22 is a photograph showing measurement of the contact angle on a sample H.

The sample H is an example in which a moth-eye film was not formed on a glass plate or a black acrylic plate (i.e. a laminate of a moth-eye film and a base film was formed). The moth-eye film was obtained from the resin composition b. The pitch (width between adjacent projections) of the moth-eye film is 100 nm, and the height of each projection is 180 nm. As shown in FIG. 22, the contact angle of the surface of the moth-eye film with water in the sample H was 10.9°.

Figure 23:
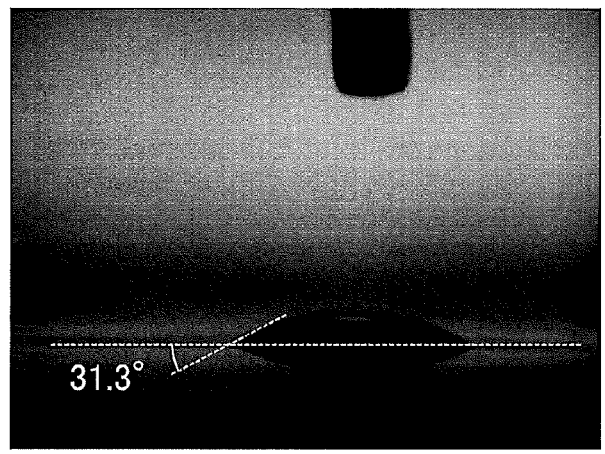
FIG. 23 is a photograph showing measurement of the contact angle on a sample I.

The sample I is an example in which a flat film with no moth-eye structure was formed on a glass plate. The flat film was obtained from the resin composition a. As shown in FIG. 23, the contact angle of the surface of the flat film with water in the sample I was 31.3°. That is, the contact angle of the resin composition a with water was 31.3°.

Figure 24:
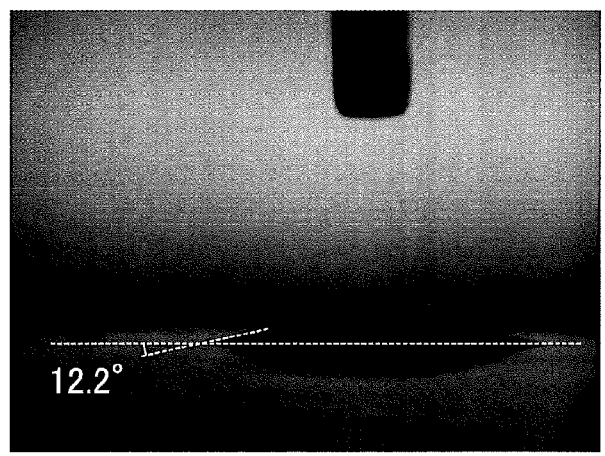
FIG. 24 is a photograph showing measurement of the contact angle on a sample J.

The sample J is an example in which a flat film with no moth-eye structure was formed on a glass plate. The flat film was obtained from the resin composition b. As shown in FIG. 24, the contact angle of the surface of the flat film with water in the sample J was 12.2°. That is, the contact angle of the resin composition b with water was 12.2°.

Figure 25:
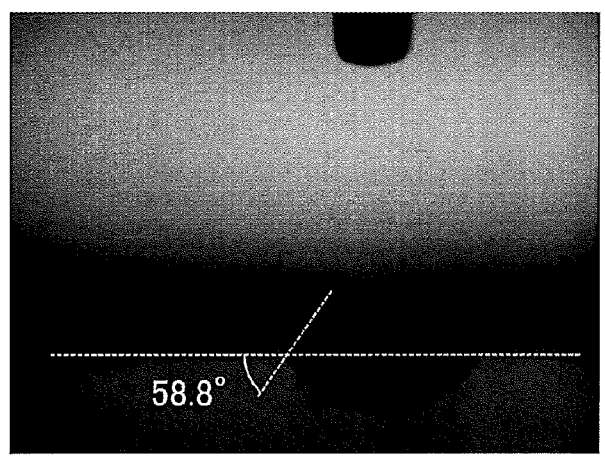
FIG. 25 is a photograph showing measurement of the contact angle on a sample K.

The sample K is a glass plate having no resin film on its surface. As shown in FIG. 25, the contact angle of the surface of the glass plate with water in the sample K was 58.8°.

Figure 26:
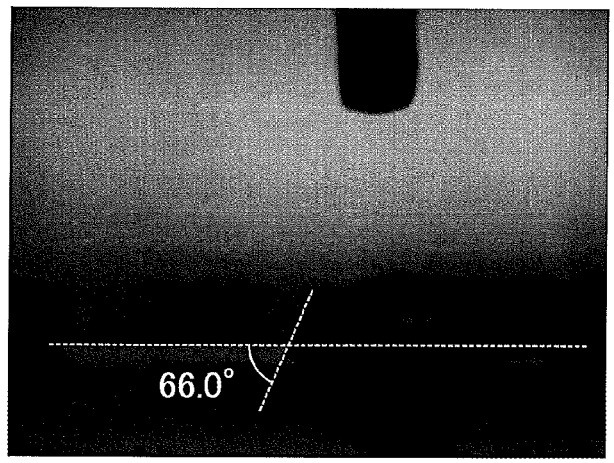
FIG. 26 is a photograph showing measurement of the contact angle on a sample L.

The sample L is a black acrylic plate having no resin film on its surface. As shown in FIG. 26, the contact angle of the surface of the black acrylic plate with water in the sample L was 66.0°.

Figure 27:
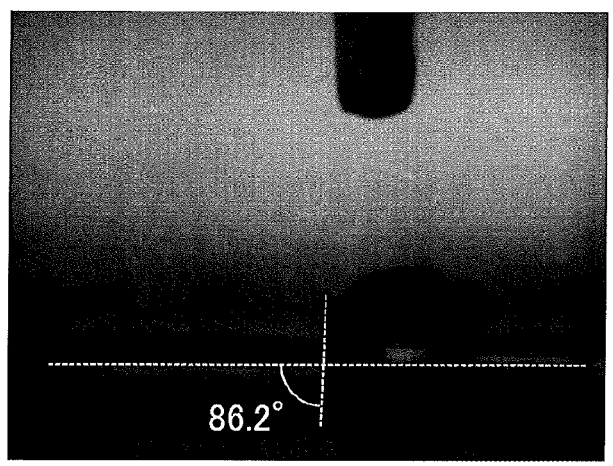
FIG. 27 is a photograph showing measurement of the contact angle on a sample M.

The sample M is an example in which a moth-eye film was formed on a glass plate. The moth-eye film was obtained from the resin composition d. The pitch (width between adjacent projections) of the moth-eye film is 200 nm, and the height of each projection is 180 nm. As shown in FIG. 27, the contact angle of the surface of the moth-eye film with water in the sample M was 86.2°.

Figure 28:
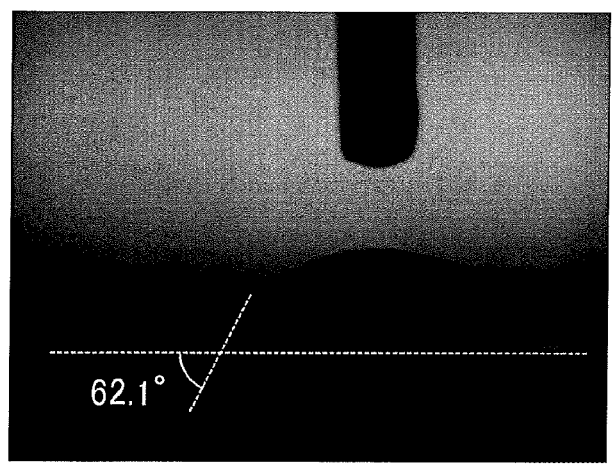
FIG. 28 is a photograph showing measurement of the contact angle on a sample N.

The sample N is an example in which a flat film with no moth-eye structure was formed on a glass plate. The flat film was obtained from the resin composition d. As shown in FIG. 28, the contact angle of the surface of the moth-eye film with water in the sample N was 62.1°.

The above results are collectively shown in the following Table 2.

TABLE 2

| No. | Film | Pitch | Height | Material | Bottom surface side | Contact angle |
|---|---|---|---|---|---|---|
| A | Moth-eye | 100 nm | 180 nm | Resin composition a | Glass plate | 9.5° |
| B | Moth-eye | 100 nm | 180 nm | Resin composition a | Black acrylic plate | 9.6° |
| C | Moth-eye | 200 nm | 180 nm | Resin composition a | Glass plate | — |
| D | Moth-eye | 200 nm | 180 nm | Resin composition a | Black acrylic plate | 17.7° |
| E | Moth-eye | 200 nm | 180 nm | Resin composition b | Glass plate | — |
| F | Moth-eye | 200 nm | 180 nm | Resin composition b | Black acrylic plate | 11.0° |
| G | Moth-eye | 100 nm | 180 nm | Resin composition c | Black acrylic plate | 122.5° |
| H | Moth-eye | 100 nm | 180 nm | Resin composition b | Glass plate | 10.9° |
| I | Flat | — | — | Resin composition a | Glass plate | 31.3° |
| J | Flat | — | — | Resin composition b | Glass plate | 12.2° |
| K | — | — | — | — | Glass plate | 58.8° |
| L | — | — | — | — | Black acrylic plate | 66.0° |
| M | Moth-eye | 200 nm | 180 nm | Resin composition d | Glass plate | 86.2° |
| N | Flat | — | — | Resin composition d | Glass plate | 62.1° |

Also, the samples A to N were tested to determine generation of condensation. Each sample was left to sand for 24 hours or longer in a refrigerator set to a predetermined temperature. The sample was then taken out to an atmosphere with a room temperature of 25° C. and a humidity of 45%, so that generation of condensation was visually observed. Here, the sample was observed after 5 minutes from taking out of the sample, and generation of condensation was determined by presence or absence of residual droplets of water. That is, even when condensation occurred immediately after taking out of the sample from the refrigerator, the sample is considered to have caused no condensation if the sample dried up within 5 minutes.

These test results are collectively shown in the following Table 3. There were three preset temperatures in the refrigerator, namely 9° C. and 1° C., and −15° C.

TABLE 3

| No. | Condensation when sample was taken out from 9° C. condition (after 5 min) | Condensation when sample was taken out from 1° C. condition (after 5 min) | Condensation when sample was taken out from −15° C. condition (after 5 min) |
|---|---|---|---|
| A | Not observed | Observed | Observed |
| B | Not observed | Observed | Observed |
| C | Not observed | Observed | Observed |
| D | Not observed | Observed | Observed |
| E | Not observed | Not observed | Observed |
| F | Not observed | Not observed | Observed |
| G | Observed | Observed | Observed |
| H | Not observed | Observed | Observed |
| I | Not observed | Not observed | Not observed |
| J | Not observed | Not observed | Not observed |
| K | Observed | Observed | Observed |
| L | Observed | Observed | Observed |
| M | Observed | Observed | Observed |
| N | Observed | Observed | Observed |

<The Case where Sample was Taken Out from Environment with Temperature of 9° C.>

Although slight condensation occurred at the corners of the film of each of the sample B and the sample D after about 1 minute from right after taking out of the sample, the condensation did not spread over the entire surface, and the entire surface dried up after 3 minutes. Condensation was not observed on the sample A and the sample C.

<The Case where Sample was Taken Out from Environment with Temperature of 1° C.>

Although slight condensation occurred at the corners of the film of the sample F after about 1 minute from right after taking out of the sample, the condensation did not spread over the entire surface, and the entire surface dried up after 5 minutes. Condensation was not observed on the sample E. Condensation was observed on the sample C and the sample D. Condensation was not observed on the samples I and J from right after taking out of the sample.

<The Case where Sample was Taken Out from Environment with Temperature of −15° C.>

Condensation occurred on the sample I and the sample J after 10 seconds from taking out of the sample from an environment with a temperature of −15° C., but the entire surface dried up after 30 seconds. The sample I and the sample J dried up at the same time. Condensation was observed on the entire body of the samples C, D, E, and F.

Condensation occurred (in practice, the surface clouded) at each of these temperatures on the sample G, the sample M, the sample N, the sample K (glass plate), and the sample L (black acrylic plate). The case where the sample was taken out from an environment with a temperature of 1° C. resulted in heavier cloud than the case where the sample was taken out from an environment with a temperature of 9° C.

The evaluation results are described below.

As shown in Table 2, the contact angle of the moth-eye film with water in the case of using the resin composition a depends on the shapes of the projection/recess pattern of the moth-eye film. In the case that the pitch was 100 nm, the contact angle was 9.5° to 9.6°, and in the case that the pitch was 200 nm, the contact angle was 17.7°. Also, in the case of a flat film without a moth-eye structure, the contact angle was 31.3° which was different from the case of a moth-eye film.

Meanwhile, as shown in Table 2, the contact angle of the moth-eye film with water in the case of using the resin composition b appeared to be independent of the shapes of the projection/recess pattern of the moth-eye film. In the case that the pitch was 100 nm, the contact angle was 10.9°, and in the case that the pitch was 200 nm, the contact angle was 11.0°. Also, in the case of a flat film without a moth-eye structure, the contact angle was 12.2°, showing no great difference.

Comparison of the results in Table 2 and Table 3 reveals that the contact angle of the surface of a moth-eye film may change depending on the pitch or the height. The comparison, however, also suggests that the correlation between the generation of condensation and the features of the samples depends on the inherent properties of the resin composition as a material of the moth-eye film, not on the contact angle on the surface of the moth-eye film. In practice, the samples A to D and I obtained from the resin composition a exhibited favorable results, and the samples E and F obtained from the resin composition b exhibited better results.

These results have probably been produced because generation of condensation itself depends not only on generation of droplets of water but also on reevaporation of the droplets after the condensation (that is, in the case where the product dries up immediately, condensation is considered to have not occurred). In order to cause reevaporation, it would be advantageous if the resin composition thinly and widely spreads. In this respect, a small contact angle is regarded as advantageous for generation of reevaporation, but the properties of the resin composition has to be taken into consideration in determination of the reevaporation property of the thinly, widely spread composition. The contact angle on the surface of the completed moth-eye film alone is therefore insufficient to draw a conclusion about the correlation with generation of condensation. Hence, whether or not condensation occurs can be determined in consideration of the properties of the resin composition constituting the moth-eye film.

Based on the above considerations, the present inventors have made a conclusion that a certain degree of the effect of preventing condensation can be achieved when the contact angle with water of a flat resin film formed from a resin composition used for moth-eye films is larger than 5° and smaller than 31.3° after 100 msec from contact of a droplet of water on the surface of the resin film. The inventors have thereby arrived at the present invention. Here, the contact angle is set to larger than 5° because the measurement limit for the currently available contact angle meter (i.e. the limit of the value which can be accepted with high reliability) is 5°.

As is apparent from comparison between the sample C and the sample I and comparison between the sample E, the sample H, and the sample J in Table 2 and Table 3, the above Evaluation Test 1 does not show results that a fine projection structure (moth-eye structure) lowers the possibility of condensation. The results rather show that films with no fine projection structure reduce the possibility of condensation. Also, comparison of the results of the cases where the sample E and the sample H were taken out from the respective 1° C. environments reveals that the sample E with a smaller "aspect ratio" which is defined as the height/pitch of fine projections more reduces the possibility of condensation.

However, a small aspect ratio indicates a small surface area, which is expected to reduce the amount of condensation. In order to focus on the factor of reevaporation, the evaporation time and the contact diameter of the droplet after contact of 0.21 μl (including an error of ±5%) of the droplet on the film were measured as another evaluation test.

Evaluation Test 2

The samples A to K used in Evaluation Test 2 are the same as the samples A to K used in the above Evaluation Test 1. In Evaluation Test 2, a sample O obtained by adhering a TAC film to a black acrylic plate was prepared as another sample.

FIG. 29 to FIG. 37 show photographs indicating the change with time in the state of a droplet dropped on the respective samples A to K and O, after leaving the sample to stand for a certain time. The double arrow in each of FIGS. 29 to 37 indicates a contact diameter.

Figure 29:
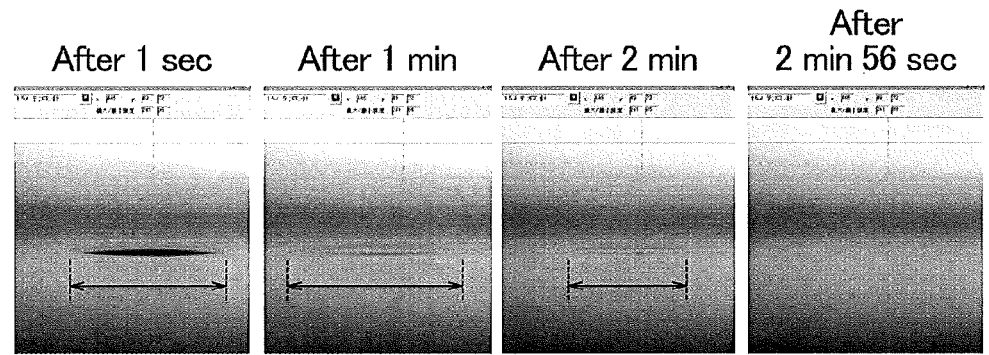
FIG. 29 shows photographs of the states of a droplet when the droplet has been dropped onto the sample A and left to stand for a certain time.

As shown in FIG. 29, when 0.21 μl (±5%) of a droplet (of water) was dropped onto the sample A and the sample was left to stand at a temperature of 23.7° C. and a humidity of 46%, the droplet evaporated after 2 minutes and 56 seconds.

Figure 30:
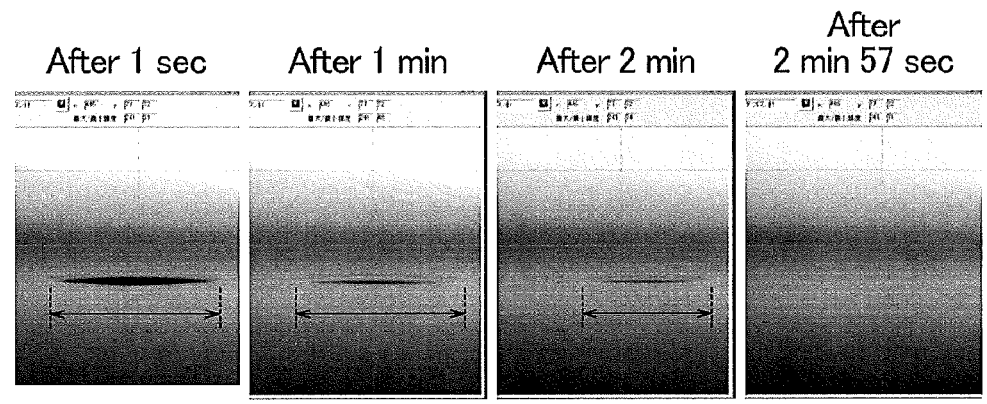
FIG. 30 shows photographs of the states of a droplet when the droplet has been dropped onto the sample B and left to stand for a certain time.

As shown in FIG. 30, when 0.21 μl (±5%) of a droplet (of water) was dropped onto the sample B and the sample was left to stand at a temperature of 24.4° C. and a humidity of 39%, the droplet evaporated after 2 minutes and 57 seconds.

Figure 31:
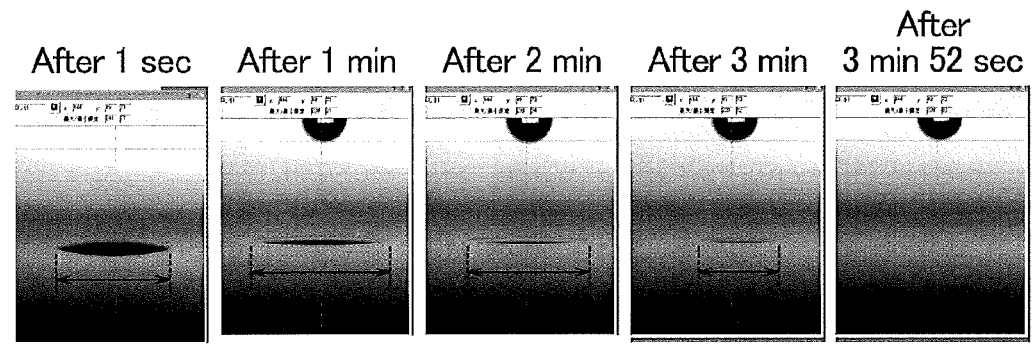
FIG. 31 shows photographs of the states of a droplet when the droplet has been dropped onto the sample D and left to stand for a certain time.

As shown in FIG. 31, when 0.21 μl (±5%) of a droplet (of water) was dropped onto the sample D and the sample was left to stand at a temperature of 24.4° C. and a humidity of 39%, the droplet evaporated after 3 minutes and 52 seconds.

Figure 32:
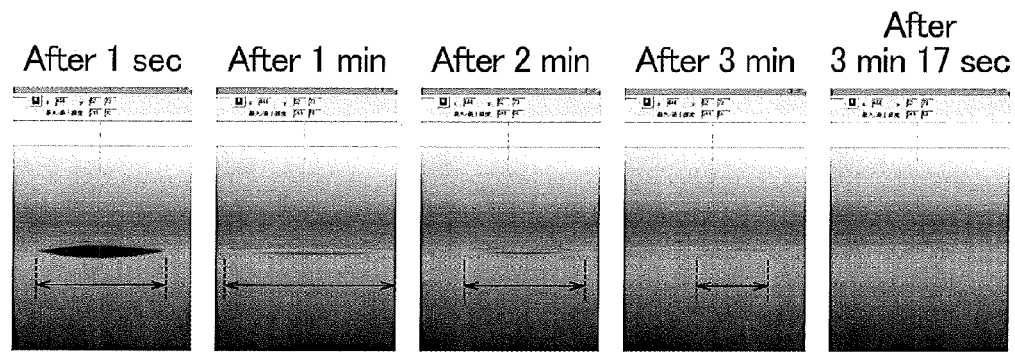
FIG. 32 shows photographs of the states of a droplet when the droplet has been dropped onto the sample F and left to stand for a certain time.

As shown in FIG. 32, when 0.21 μl (±5%) of a droplet (of water) was dropped onto the sample F and the sample was left to stand at a temperature of 24.4° C. and a humidity of 39%, the droplet evaporated after 3 minutes and 17 seconds.

Figure 33:
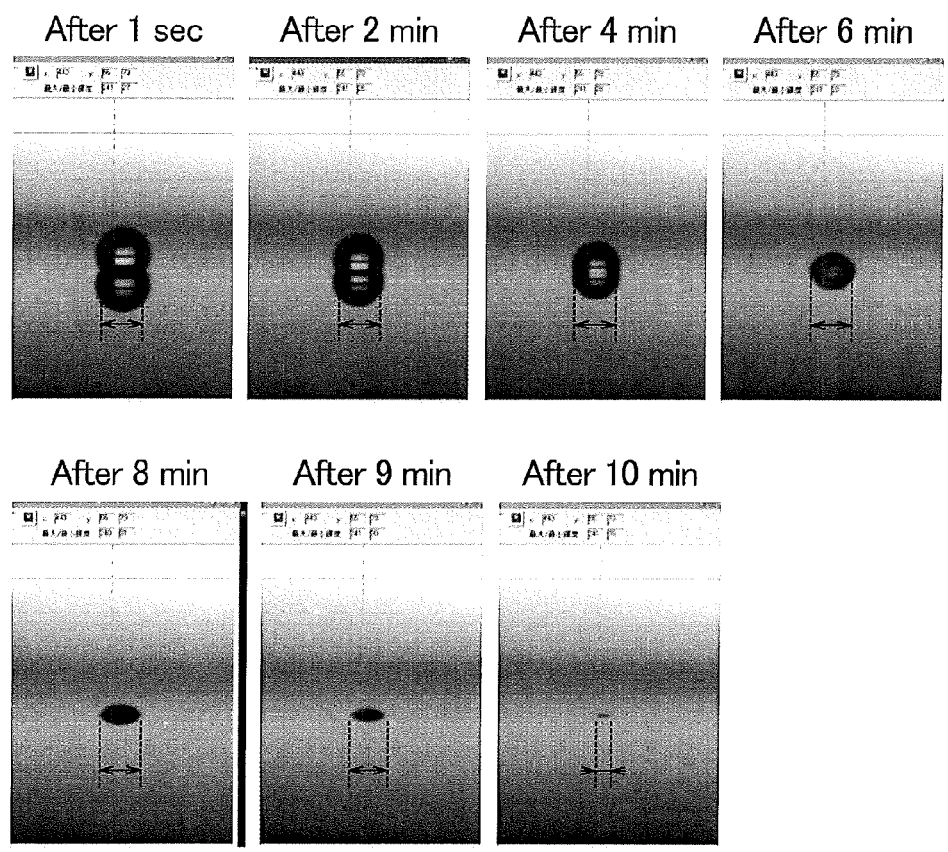
FIG. 33 shows photographs of the states of a droplet when the droplet has been dropped onto the sample G and left to stand for a certain time.

As shown in FIG. 33, when 0.21 μl (±5%) of a droplet (of water) was dropped onto the sample G and the sample was left to stand at a temperature of 23.7° C. and a humidity of 46%, the droplet evaporated after 10 minutes and 22 seconds.

Figure 34:
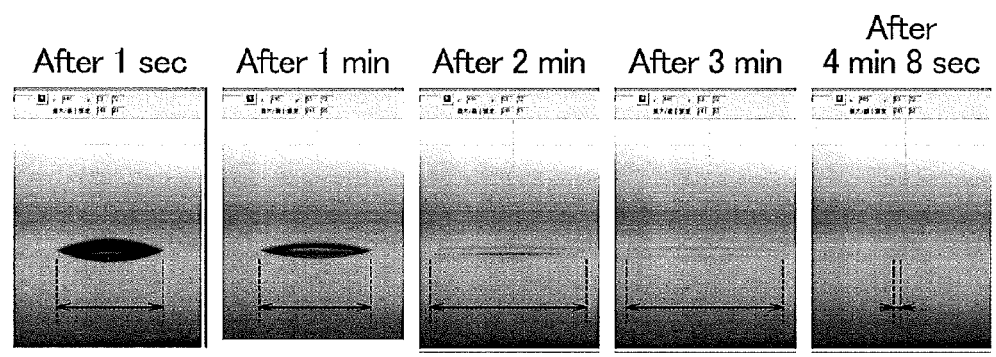
FIG. 34 shows photographs of the states of a droplet when the droplet has been dropped onto the sample I and left to stand for a certain time.

As shown in FIG. 34, when 0.21 μl (±5%) of a droplet (of water) was dropped onto the sample I and the sample was left to stand at a temperature of 23.9° C. and a humidity of 40%, the droplet evaporated after 4 minutes and 8 seconds.

Figure 35:
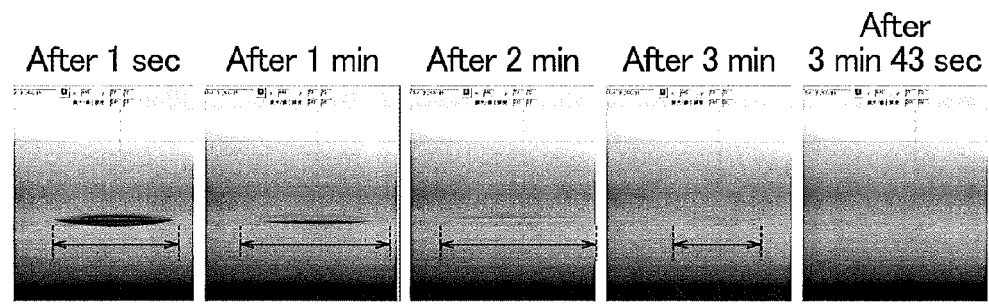
FIG. 35 shows photographs of the states of a droplet when the droplet has been dropped onto the sample J and left to stand for a certain time.

As shown in FIG. 35, when 0.21 μl (±5%) of a droplet (of water) was dropped onto the sample J and the sample was left to stand at a temperature of 23.9° C. and a humidity of 40%, the droplet evaporated after 3 minutes and 43 seconds.

Figure 36:
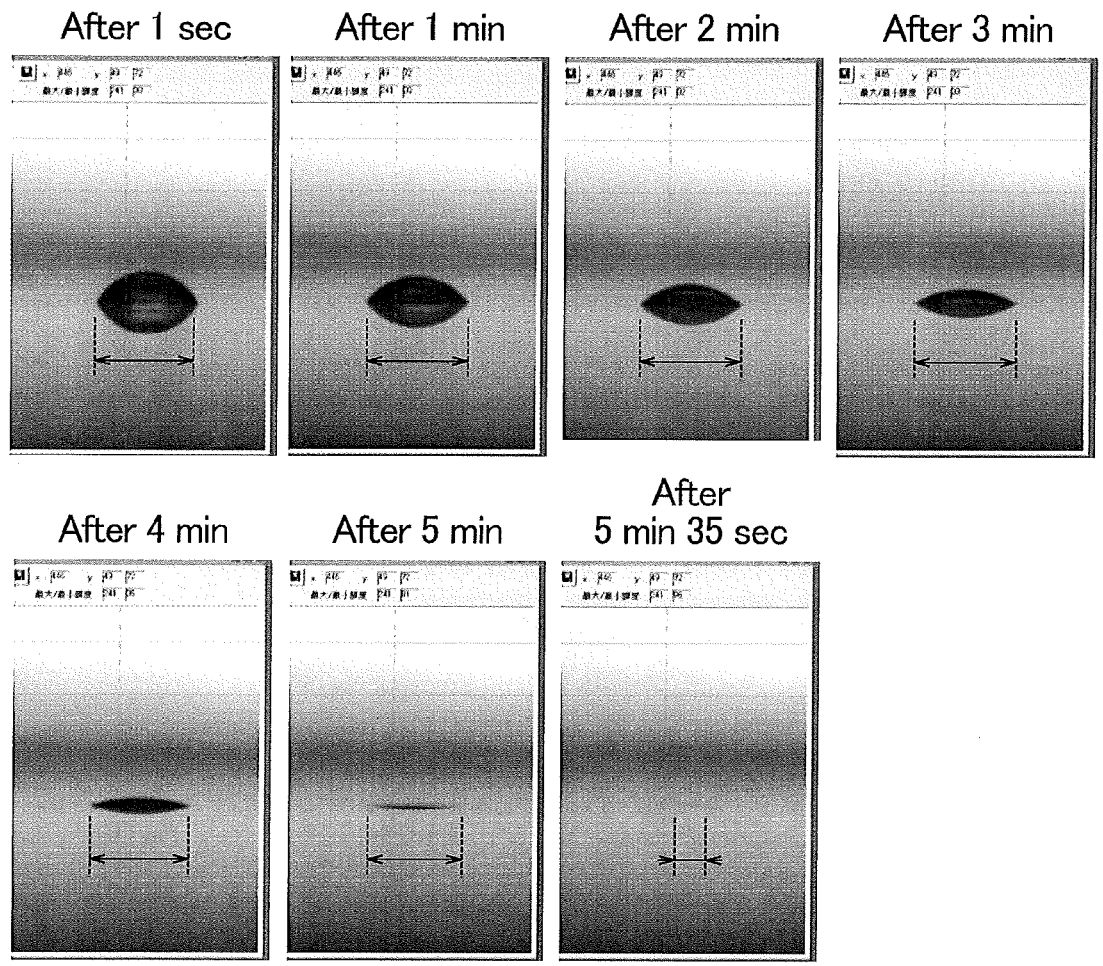
FIG. 36 shows photographs of the states of a droplet when the droplet has been dropped onto the sample K and left to stand for a certain time.

As shown in FIG. 36, when 0.21 μl (±5%) of a droplet (of water) was dropped onto the sample K and the sample was left to stand at a temperature of 23.9° C. and a humidity of 40%, the droplet evaporated after 5 minutes and 35 seconds.

Figure 37:
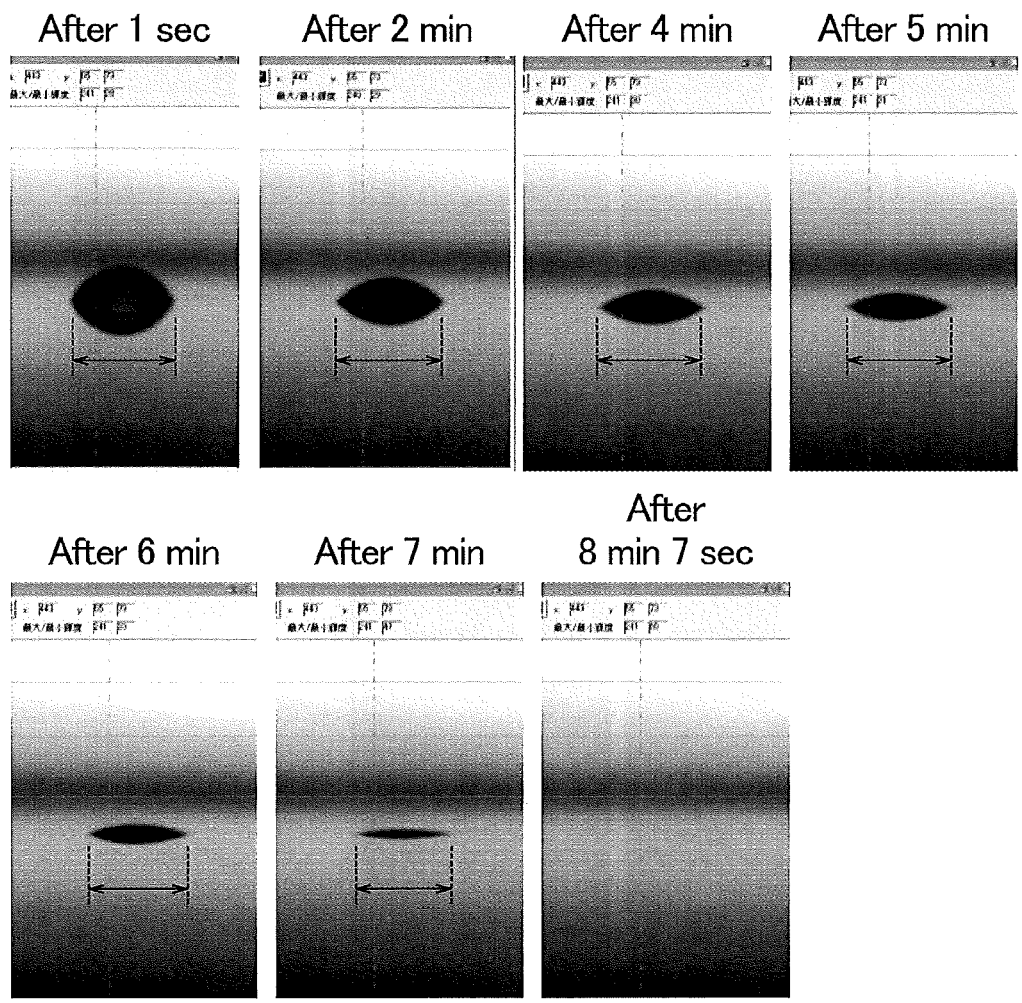
FIG. 37 shows photographs of the states of a droplet when the droplet has been dropped onto the sample 0 and left to stand for a certain time.

As shown in FIG. 37, when 0.21 μl (±5%) of a droplet (of water) was dropped onto the sample O and the sample was left to stand at a temperature of 23.7° C. and a humidity of 46%, the droplet evaporated after 8 minutes and 7 seconds.

The above results are collectively shown in the following Table 4.

TABLE 4

| No. | Film | Pitch | Height | Material | Bottom surface side | Temperature | Humidity | Evaporation time |
|---|---|---|---|---|---|---|---|---|
| A | Moth-eye | 100 nm | 180 nm | Resin composition a | Glass plate | 23.7° C. | 46% | 2 m 56 s |
| B | Moth-eye | 100 nm | 180 nm | Resin composition a | Black acrylic plate | 24.4° C. | 39% | 2 m 57 s |
| C | Moth-eye | 200 nm | 180 nm | Resin composition a | Glass plate | — | — | — |
| D | Moth-eye | 200 nm | 180 nm | Resin composition a | Black acrylic plate | 24.4° C. | 39% | 3 m 52 s |
| E | Moth-eye | 200 nm | 180 nm | Resin composition b | Glass plate | — | — | — |
| F | Moth-eye | 200 nm | 180 nm | Resin composition b | Black acrylic plate | 24.4° C. | 39% | 3 m 17 s |
| G | Moth-eye | 100 nm | 180 nm | Resin composition c | Black acrylic plate | 23.7° C. | 46% | 10 m 22 s |
| H | Moth-eye | 100 nm | 180 nm | Resin composition b | Glass plate | — | — | — |

TABLE 4-continued

| No. | Film | Pitch | Height | Material | Bottom surface side | Temperature | Humidity | Evaporation time |
|---|---|---|---|---|---|---|---|---|
| I | Flat | — | — | Resin composition a | Glass plate | 23.9° C. | 40% | 4 m 8 s |
| J | Flat | — | — | Resin composition b | Glass plate | 23.9° C. | 40% | 3 m 43 s |
| K | — | — | — | — | Glass plate | 23.9° C. | 40% | 5 m 35 s |
| O | Flat | — | — | TAC film | Black acrylic plate | 23.7° C. | 46% | 8 m 7 s |

The above experiment results show that a droplet evaporates faster on a moth-eye film than on a flat film in the case that films are formed from the same resin composition. This conclusion can be made by comparison of the samples A, B, D, and I for the resin composition a, and by comparison of the samples F and J for the resin composition b.

Comparison of the samples A, B, and D shows that a droplet is more likely to evaporate on a moth-eye film having a higher aspect ratio.

Also, comparison of the samples A and B shows that the tendency of a droplet to evaporate does not greatly differ on a glass plate and a black acrylic plate.

The droplet dropped onto a moth-eye film having a surface hydrophilicity (samples A, B, D, and F) was found to have the maximum contact diameter after 1 minute from the dropping, and then reevaporate by decreasing the contact diameter. That is, the droplet was found to reevaporate by decreasing the wet area, not by wet spreading.

Meanwhile, a droplet dropped onto a flat film without a moth-eye structure (samples I, J, K, and O) or a moth-eye film having a surface water repellence (sample G) reached the maximum contact diameter after 2 minutes or later from the dropping, or maintained the maximum contact diameter after 2 minutes or later from the dropping. The film on which the droplet reached the maximum contact diameter after 2 minutes or later from the dropping (sample I) was found to reevaporate by wet spreading.

Figure 38:
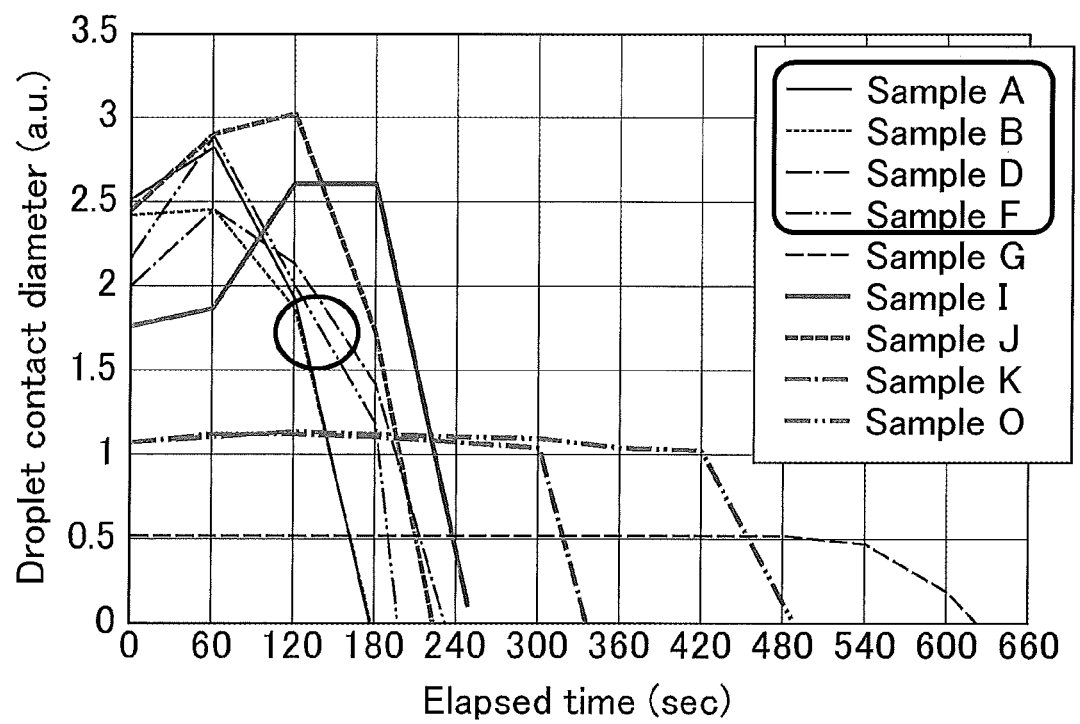
FIG. 38 is a graph showing the relation between the contact diameter of the droplet and the elapsed time in Evaluation Test 2.
Figure 39:
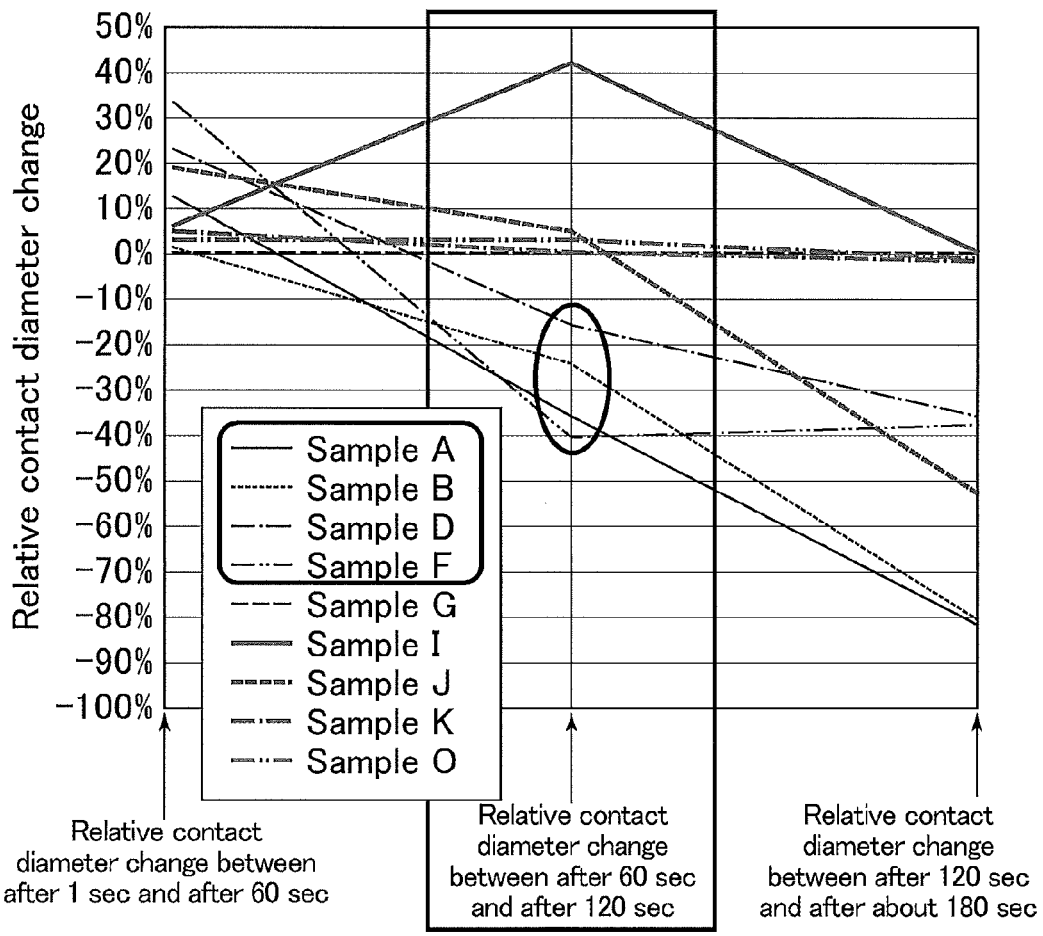
FIG. 39 is a graph showing a change in the relative contact diameter after a first given time from the contact of the droplet with the surface and a second given time from the first given time in Evaluation Test 2.

These result data are collectively plotted in graphs in FIG. 38 and FIG. 39. FIG. 38 is a graph showing the relation between the contact diameter of the droplet and the elapsed time. FIG. 39 is a graph showing a change in the relative contact diameter after a first given time from the contact of the droplet with the surface and a second given time from the first given time.

In FIG. 39, with the contact diameter after 1 second from the dropping as a reference value, a relative contact diameter after an elapse of a certain time, represented in percentage, is a "contact diameter change rate". That is, "the contact diameter change rate after Z seconds" is represented by "contact diameter after Z seconds from dropping/contact diameter after 1 second from dropping". In FIG. 39, "the relative contact diameter change after X seconds from dropping and after Y seconds from dropping" is calculated by "contact diameter change rate after Y seconds from dropping"–"contact diameter change rate after X seconds from dropping".

The portion surrounded by the thick line in FIG. 39 shows that in the case of a moth-eye film having surface hydrophilicity (samples A, B, D, and F), both the relative contact diameter change rates after 60 seconds from dropping and after 120 seconds from dropping are –10% or lower. In contrast, in the case of a flat film without a moth-eye structure (samples I, J, K, and O) and a moth-eye film having a surface water repellence (sample G), both the relative contact diameter change rates after 60 seconds from dropping and after 120 seconds from dropping are 0% or higher.

FIG. 39 therefore also leads to the conclusion that the contact diameter tends to decrease with time in the case of the moth-eye film having surface hydrophilicity (samples A, B, D, and F), and the contact diameter tends to increase with time or tends to be maintained in the case of a flat film without a moth-eye structure (samples I, J, K, and O) and a moth-eye film having surface water repellence (sample G).

The above results also show that a droplet with a smaller apparent surface area evaporates faster than a droplet with a greater apparent surface area, which is not found in the conventional knowledge. For example, Patent Literature 6 teaches that when condensed moisture formed a thin water film over a coated surface, reevaporation from the coated surface occurs in a short time.

Evaluation Test 3

Next, the relation between evaporation time and amount of a droplet was studied. The temporal change of the contact diameter is expected to depend on the dropped amount. The experiments were performed with four reference droplet amounts, namely 0.21 µl, 0.75 µl, 1.28 µl, and 1.81 µl (all including an error of ±15%).

For Evaluation Test 3, new samples P (P1 to P4) and the samples Q (Q1 to Q4) were prepared. The samples P and Q were formed from the same resin composition, and the one with a moth-eye structure is referred to as the sample P, and the one without a moth-eye film is referred to as the sample Q.

The sample P is an example in which a moth-eye film was formed on a black acrylic plate. The moth-eye film was obtained from the resin composition b. The pitch (width between adjacent projections) of the moth-eye film was 200 nm, and the height of each projection was 180 nm. FIG. 40 to FIG. 43 each show photographs indicating evaporation of a certain amount of a droplet dropped on a sample P.

Figure 40:
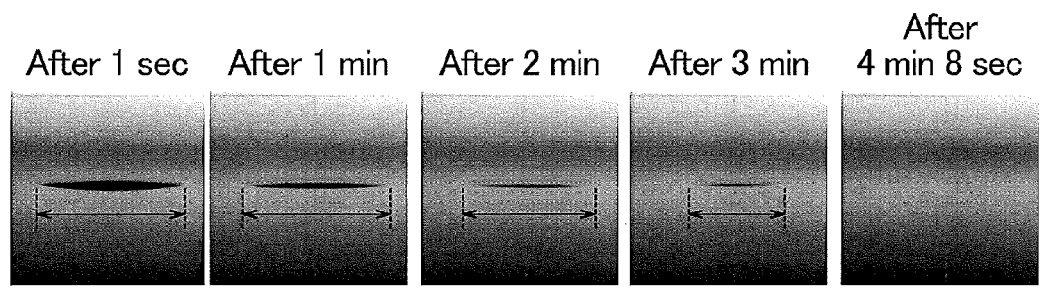
FIG. 40 shows photographs of temporal evaporation states when a certain amount of a droplet has been dropped onto a sample P1.

As shown in FIG. 40, when 0.21 µl of a droplet (of water) was dropped onto the sample P1 and the sample was left to stand at a temperature of 25.6° C. and a humidity of 44%, the droplet evaporated after 4 minutes and 8 seconds.

Figure 41:
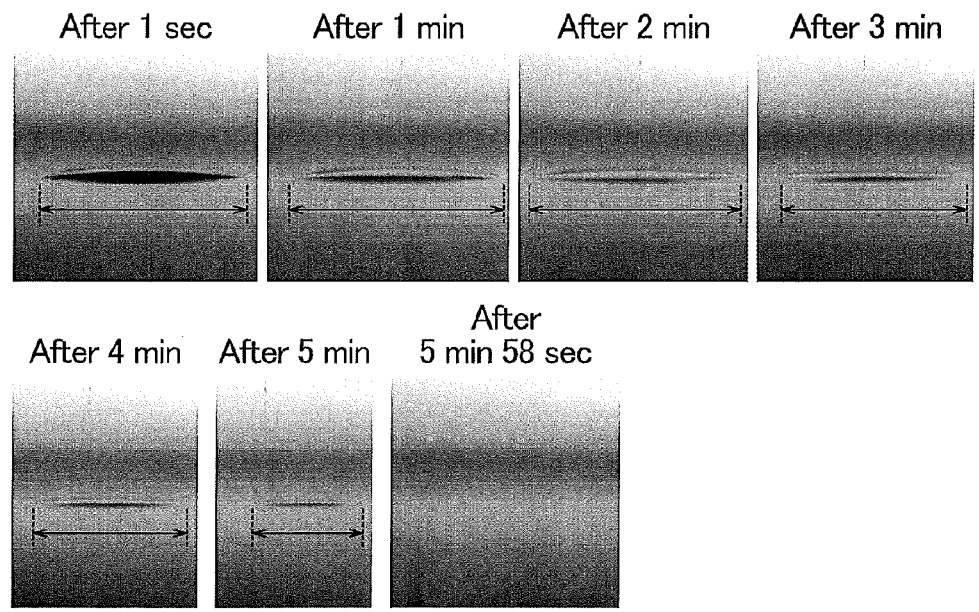
FIG. 41 shows photographs of temporal evaporation states when a certain amount of a droplet has been dropped onto a sample P2.

As shown in FIG. 41, when 0.75 µl of a droplet (of water) was dropped onto the sample P2 and the sample was left to stand at a temperature of 25.6° C. and a humidity of 44%, the droplet evaporated after 5 minutes and 58 seconds.

Figure 42:
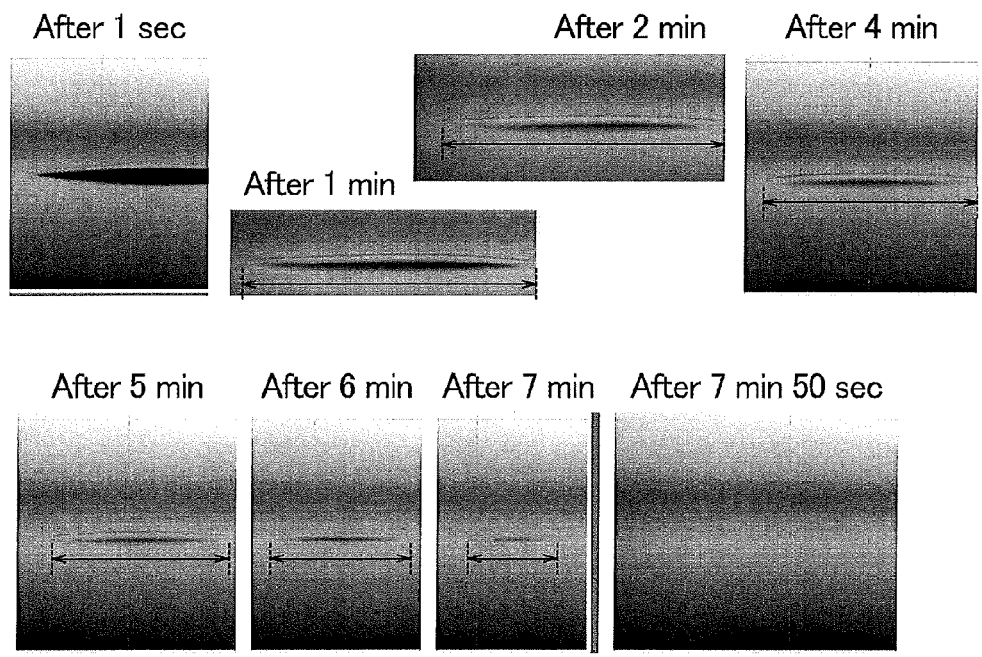
FIG. 42 shows photographs of temporal evaporation states when a certain amount of a droplet has been dropped onto a sample P3.

As shown in FIG. 42, when 1.28 µl of a droplet (of water) was dropped onto the sample P3 and the sample was left to stand at a temperature of 25.6° C. and a humidity of 44%, the droplet evaporated after 7 minutes and 50 seconds.

Figure 43:
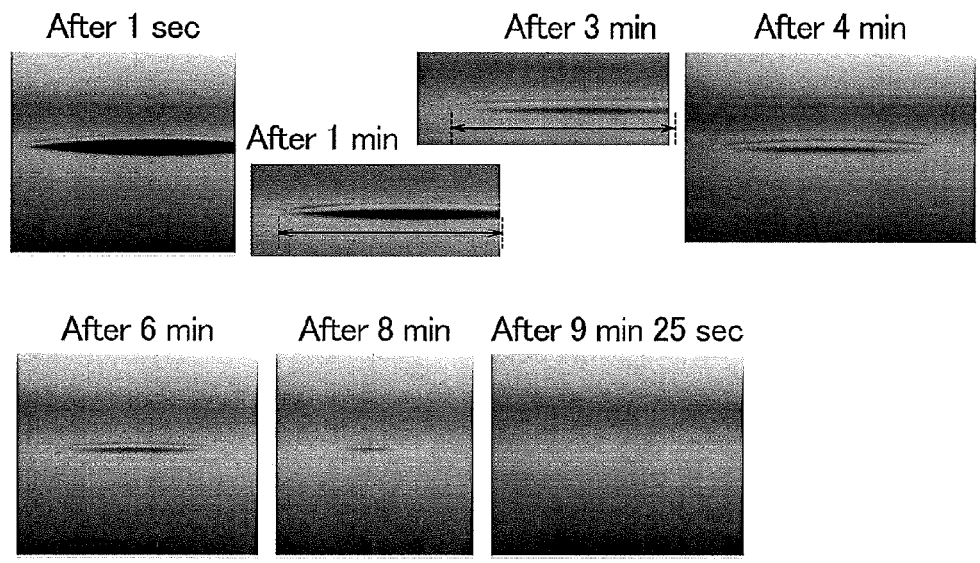
FIG. 43 shows photographs of temporal evaporation states when a certain amount of a droplet has been dropped onto a sample P4.

As shown in FIG. 43, when 1.81 µl of a droplet (of water) was dropped onto the sample P4 and the sample was left to stand at a temperature of 25.6° C. and a humidity of 44%, the droplet evaporated after 9 minutes and 25 seconds.

The sample Q is an example in which a flat film was formed on a black acrylic plate. The flat film was obtained from the resin composition b. FIG. 44 to FIG. 47 each show photographs of temporal evaporation states when a certain amount of a droplet has been dropped onto a sample Q.

Figure 44:
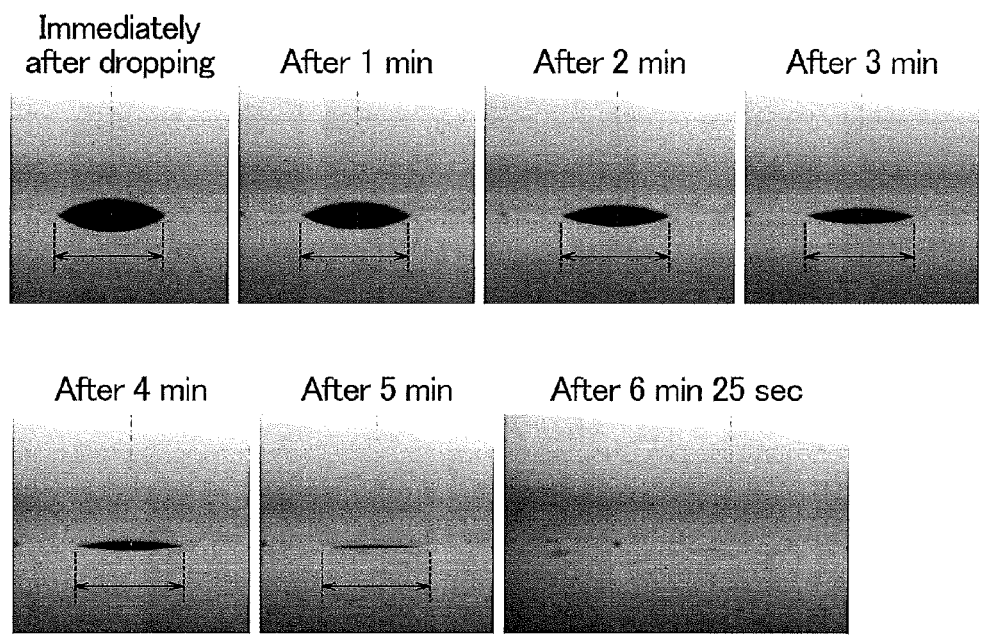
FIG. 44 shows photographs of temporal evaporation states when a certain amount of a droplet has been dropped onto a sample Q1.

As shown in FIG. 44, when 0.21 µl of a droplet (of water) was dropped onto the sample Q1 and the sample was left to stand at a temperature of 25.6° C. and a humidity of 44%, the droplet evaporated after 6 minutes and 27 seconds.

Figure 45:
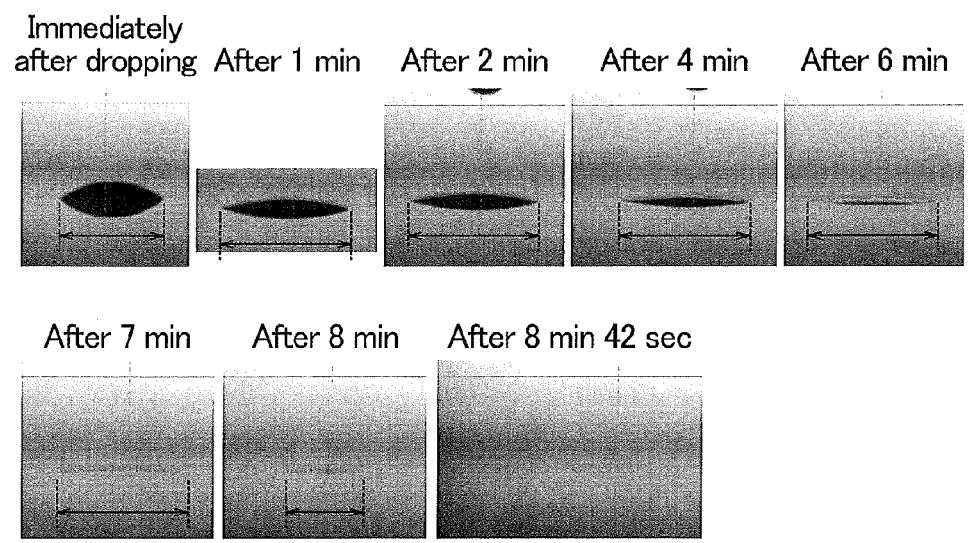
FIG. 45 shows photographs of temporal evaporation states when a certain amount of a droplet has been dropped onto a sample Q2.

As shown in FIG. 45, when 0.75 μl of a droplet (of water) was dropped onto the sample Q2 and the sample was left to stand at a temperature of 25.6° C. and a humidity of 44%, the droplet evaporated after 8 minutes and 42 seconds.

Figure 46:
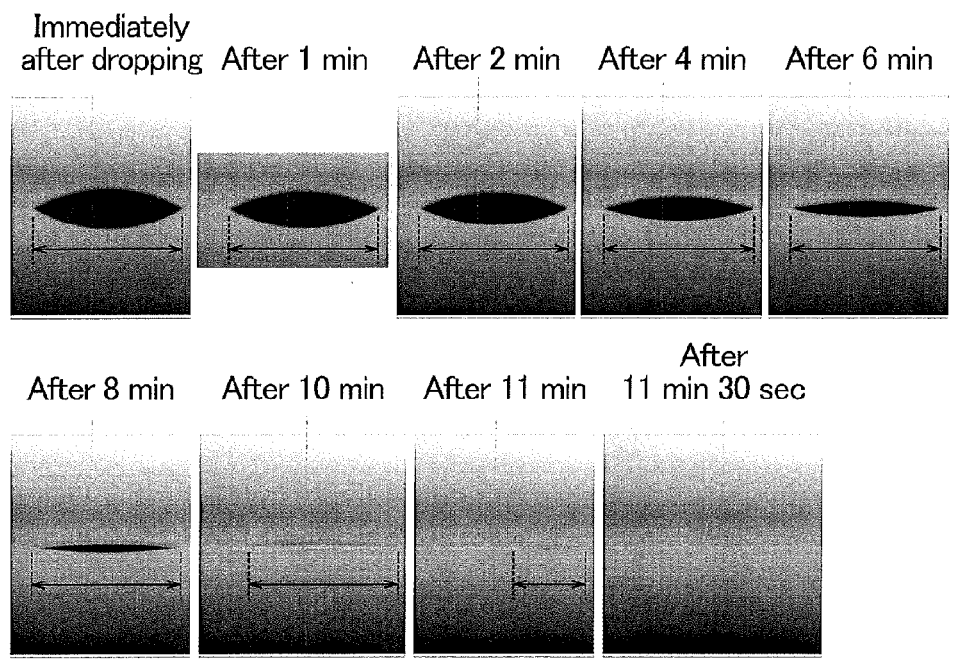
FIG. 46 shows photographs of temporal evaporation states when a certain amount of a droplet has been dropped onto a sample Q3.

As shown in FIG. 46, when 1.28 μl of a droplet (of water) was dropped onto the sample Q3 and the sample was left to stand at a temperature of 25.6° C. and a humidity of 44%, the droplet evaporated after 11 minutes and 30 seconds.

Figure 47:
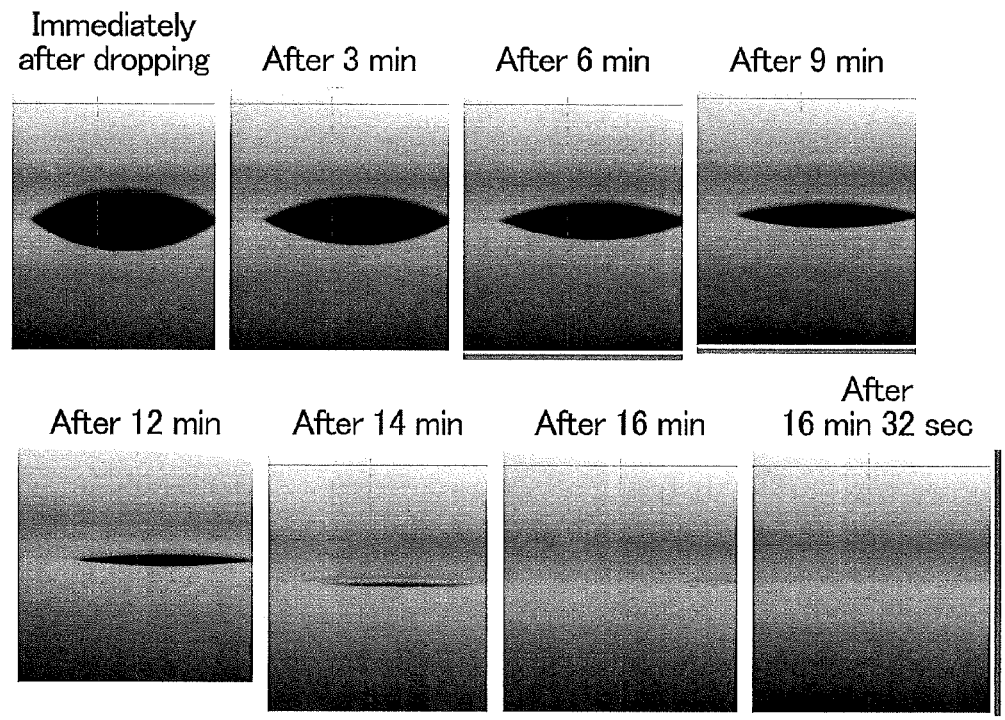
FIG. 47 shows photographs of temporal evaporation states when a certain amount of a droplet has been dropped onto a sample Q4.

As shown in FIG. 47, when 1.81 μl of a droplet (of water) was dropped onto the sample Q4 and the sample was left to stand at a temperature of 25.6° C. and a humidity of 44%, the droplet evaporated after 16 minutes and 32 seconds.

Figure 48:
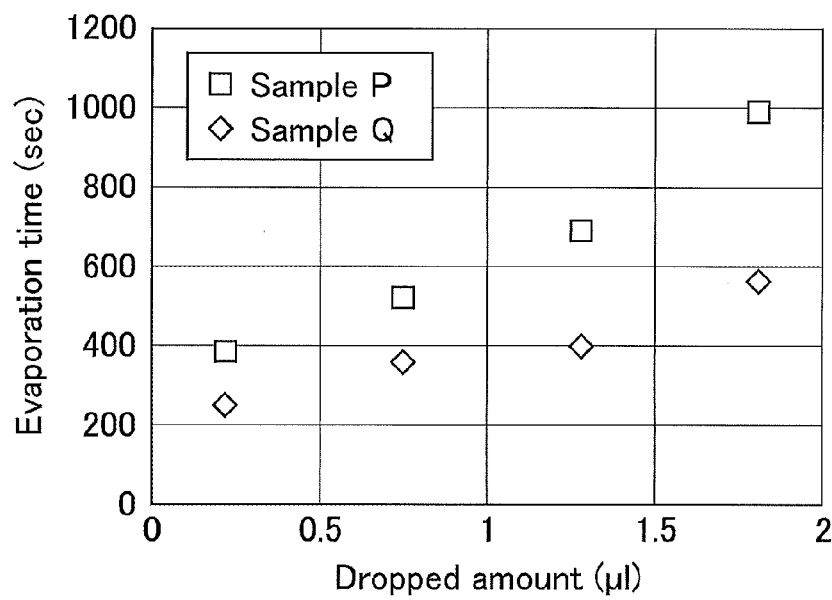
FIG. 48 is a graph showing the relation between the dropped amount of a droplet and evaporation time in Evaluation Test 3.
Figure 49:
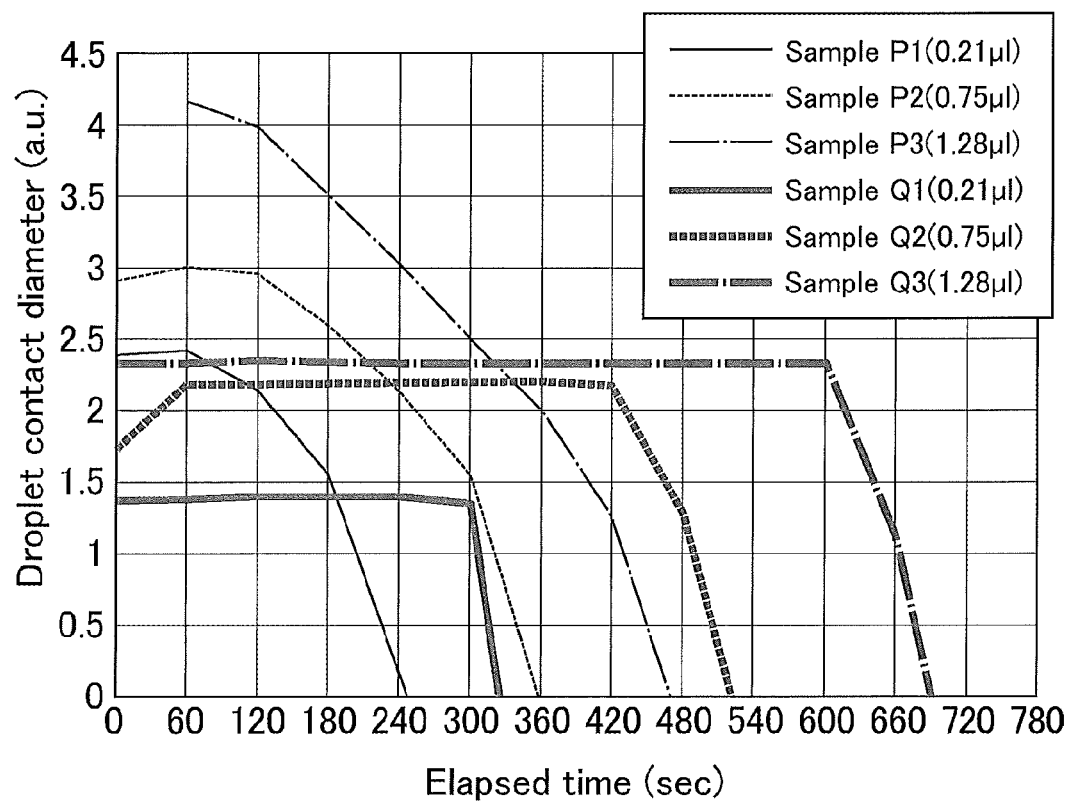
FIG. 49 is a graph showing the relation between the contact diameter of the droplet and the elapsed time in Evaluation Test 3.
Figure 50:
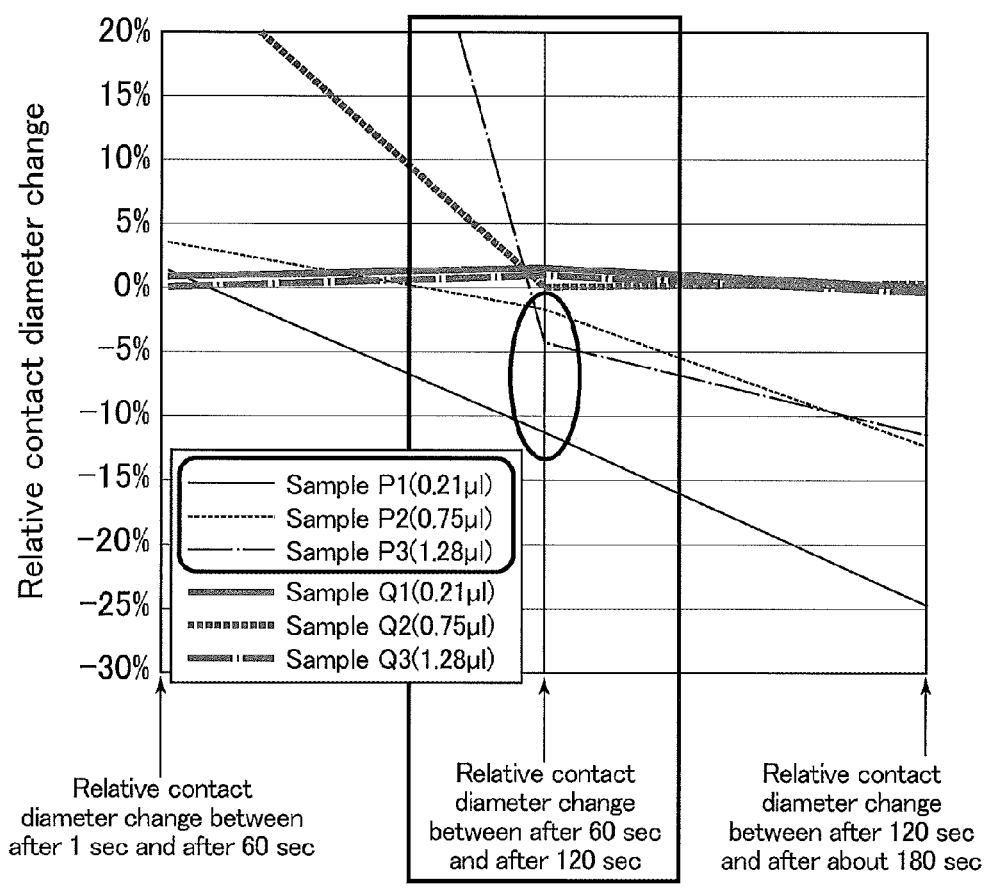
FIG. 50 is a graph showing a change in the relative contact diameter after a first given time from the contact of the droplet with the surface and a second given time from the first given time in Evaluation Test 3.
Figure 51:
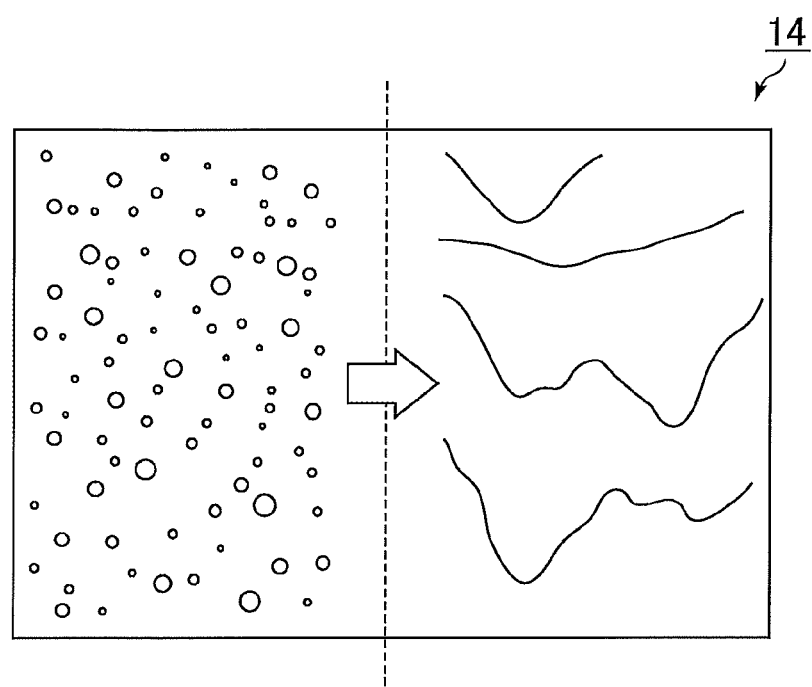
FIG. 51 is a schematic view illustrating generation of condensation on a windowpane.

The above results are collectively shown in the following Table 5. These result data are collectively plotted in graphs in FIG. 48 and FIG. 50. FIG. 48 is a graph showing the relation between the dropped amount of a droplet and evaporation time. FIG. 49 is a graph showing the relation between the contact diameter of the droplet and the elapsed time. FIG. 50 is a graph showing a change in the relative contact diameter after a first given time from the contact of the droplet with the surface and a second given time from the first given time.

As described above, a droplet dropped onto a sample having a moth-eye structure evaporates faster than a droplet dropped onto a sample without a moth-eye structure.

A sample with a moth-eye structure includes microscopic projections and recesses which cannot be observed with a microscope, and thus the surface area is effectively large in a region with a very thin film around the droplet (commonly referred to as a precedence thin film). The photographs of "after 1 minute" in FIGS. 29 to 32, 34 to 36 and 40 to 43 each include a comparatively low appearance (low darkness) region. Based on the above study, the region is considered to be a region including the very thin film around the droplet. In each photograph, the contact diameter of a droplet measured includes this region.

This is consistent with the hydrophilicity enhancing effect determined by the Wenzel's formula. According to the Wenzel's formula, when the contact angle on a flat product is smaller than 90° ($\theta<90°$), provision of projections and recesses to the product decreases the contact angle ($\phi<\theta$), while when the contact angle is larger than 90° ($\theta>90°$), provision of projections and recesses increases the contact

TABLE 5

| | No. | Film | Pitch | Height | Material | Bottom surface side | Temperature | Humidity | Dropped amount | Evaporation time |
|---|---|---|---|---|---|---|---|---|---|---|
| P | P1 | Moth-eye | 200 nm | 180 nm | Resin composition b | Black acrylic plate | 25.6° C. | 44% | 0.21 μl ± 5% | 4 m 8 s |
| | P2 | | | | | | | | 0.75 μl ± 5% | 5 m 58 s |
| | P3 | | | | | | | | 1.28 μl ± 5% | 7 m 50 s |
| | P4 | | | | | | | | 1.81 μl ± 5% | 9 m 25 s |
| Q | Q1 | Flat | — | — | Resin composition b | Black acrylic plate | 25.6° C. | 44% | 0.21 μl ± 5% | 6 m 27 s |
| | Q2 | | | | | | | | 0.75 μl ± 5% | 8 m 42 s |
| | Q3 | | | | | | | | 1.28 μl ± 5% | 11 m 30 s |
| | Q4 | | | | | | | | 1.81 μl ± 5% | 16 m 32 s |

As shown in FIG. 48, when the same amount of droplets were dropped onto the respective flat films and the moth-eye films formed from the same resin composition, the droplet on the moth-eye film evaporates faster than on the flat film regardless of the amount of the droplet.

Also, as shown in FIG. 49, a droplet dropped onto a moth-eye film having a surface hydrophilicity reached the maximum contact diameter after 1 minute from dropping and then reevaporated by decreasing the contact diameter on all the samples P1 to P4, as in the above experiments. That is, the droplet was found to reevaporate by decreasing the wet area, not by wet spreading.

Also, as shown in FIG. 49, a droplet dropped onto a flat film without a moth-eye structure reached the maximum contact diameter after 2 minutes or later from the dropping, or maintained the maximum contact diameter after 2 minutes or later from the dropping on all the samples Q1 to Q4. On the film on which a droplet reached the maximum contact diameter after 2 minutes or later from the dropping, the droplet was found to reevaporate by wet spreading.

However, as shown in the portion surrounded by the thick line in FIG. 50, some of the samples exhibited a relative contact diameter change rate between after 60 seconds from dropping and after 120 seconds from dropping was −5% or higher, which is different from the above experiment. This result shows that the relative contact diameter change rate between after 60 seconds from dropping and after 120 seconds from dropping tends to increase as the amount of the droplet increases. Also, comparison with the above experiments reveals that the time at which the contact diameter starts to decrease tends to be late as the amount of the droplet increases.

angle ($\phi>\theta$). That is, with projections and recesses on a surface, an easily wet material tends to be more wettable, and a hardly wet material tends to be less wettable. For example, glass is easily wet by water and has a contact angle of about 20° if it is flat. However, a glass plate with projections and recesses on the surface is known to be more easily wet and shows a contact angle of almost 0°. Patent Literature documents 4 and 5 also include the same teachings that fine projections provide a contact angle of smaller than 5°.

However, the contact angle of the moth-eye film used in the above Evaluation Test 1 is about 10°, which is relatively high. This finding is different from the conventional knowledge, and is very unique. This difference is probably due to a difference between the contact angle hysteresis of the conventional moth-eye films and the moth-eye films used in the above evaluations tests.

One of the factors of generation of the contact angle hysteresis is abrasion due to the projections and recesses on the surface. The projections and recesses on the surface increase the contact angle hysteresis. The size of the contact angle changes depending on the size of the contact angle hysteresis. Therefore, the contact angle is used as a quantitative index of the wettability when there is no contact angle hysteresis (that is, when the surface is flat). When the film includes projections and recesses, the contact angle and the wettability are not always related to each other.

REFERENCE SIGNS LIST

11: Base film
12: Moth-eye film
12a: Projection

12b: Base portion
13: Adhesive layer
14: Windowpane

The invention claimed is:

1. A moth-eye film comprising:
a cured resin made of a resin composition containing a surfactant and polyethylene glycol, wherein
the surfactant constitutes 0.1% to 10% by mass of the resin composition, and
the resin composition is in the form of a flat film and has a contact angle with water of larger than 5° but 31.3° or smaller, the contact angle being measured between a surface of the flat film formed of the resin composition and a droplet of water dropped onto the surface of the flat film, after 100 msec from contact of the droplet and the surface.

2. The moth-eye film according to claim 1, wherein the surfactant is a fluorosurfactant.

3. The moth-eye film according to claim 1, wherein the contact angle is from 9.5° to 11.0° inclusive.

4. The moth-eye film according to claim 1,
wherein the moth-eye film shows a value calculated by subtracting a first contact diameter from a second contact diameter of smaller than 0, the first contact diameter being a contact diameter after 60 seconds from dropping of a 0.2 to 1.0 µl of a water droplet on the surface, the second contact diameter being a contact diameter after 120 seconds from dropping of the droplet on the surface.

5. The moth-eye film according to claim 1, wherein the surfactant is a silicone surfactant.

6. The moth-eye film according to claim 1, wherein the resin composition further contains urethane methacrylate.

7. The moth-eye film according to claim 1, wherein the resin composition further contains urethane methacrylate and ester methacrylate.

* * * * *